(12) United States Patent
Alden et al.

(10) Patent No.: US 9,678,496 B2
(45) Date of Patent: Jun. 13, 2017

(54) CONCRETE MATERIAL DISPENSING SYSTEM

(75) Inventors: Kevin Odell Alden, Huntington Beach, CA (US); Ken Smelquist, Edmonton (CA)

(73) Assignees: Amtec Meter & Controls, Inc., Huntington Beach, CA (US); Optimum Instruments, Inc., Edmonton, Alberta (CA)

( * ) Notice: Subject to any disclaimer, the term of this patent is extended or adjusted under 35 U.S.C. 154(b) by 0 days.

(21) Appl. No.: 13/035,949

(22) Filed: Feb. 26, 2011

(65) Prior Publication Data

US 2011/0166689 A1   Jul. 7, 2011

Related U.S. Application Data

(63) Continuation-in-part of application No. 12/470,671, filed on May 22, 2009.

(60) Provisional application No. 61/055,647, filed on May 23, 2008.

(51) Int. Cl.
| | | |
|---|---|---|
| G05B 19/042 | (2006.01) | |
| G05B 15/02 | (2006.01) | |
| G05B 19/418 | (2006.01) | |
| G05B 23/02 | (2006.01) | |

(52) U.S. Cl.
CPC ......... *G05B 19/0421* (2013.01); *G05B 15/02* (2013.01); *G05B 19/4185* (2013.01); *G05B 23/0275* (2013.01); *G05B 2219/33273* (2013.01); *Y02P 90/14* (2015.11); *Y02P 90/18* (2015.11)

(58) Field of Classification Search
CPC .............. B01F 15/0416; B01F 15/0479; B01F 15/0035; B01F 15/0408; B01F 15/00123; B28C 7/0418; B28C 7/0481; B28C 7/163; B29C 7/0418; B29C 7/0481; B29C 7/163; G05B 19/0421
USPC ................ 366/17, 40, 151.1, 152.2; 700/265
See application file for complete search history.

(56) References Cited

U.S. PATENT DOCUMENTS

| | | | | |
|---|---|---|---|---|
| 3,448,967 | A * | 6/1969 | Seanor et al. | ................... 366/18 |
| 4,197,070 | A * | 4/1980 | Koschmann | ................... 425/135 |
| 4,209,258 | A * | 6/1980 | Oakes | ........................... 366/138 |
| 4,272,466 | A * | 6/1981 | Harris | ........................... 264/40.6 |
| 4,437,046 | A * | 3/1984 | Faillace | ........................ 318/571 |
| 4,872,352 | A * | 10/1989 | Alden et al. | ............... 73/861.77 |
| 5,332,366 | A | 7/1994 | Anderson | |
| 5,431,302 | A | 7/1995 | Tulley et al. | |
| 5,590,958 | A * | 1/1997 | Dearing et al. | ................. 366/20 |
| 5,653,533 | A | 8/1997 | Green | |

(Continued)

OTHER PUBLICATIONS

Ace-Co, Ace-Co Products, www.ace-co.com/products, 2 pp., accessed Jun. 22, 2009.

(Continued)

*Primary Examiner* — Abbas Rashid
(74) *Attorney, Agent, or Firm* — Stoel Rives LLP

(57) ABSTRACT

A control system for a concrete plant adds intelligent capabilities in the concrete plant that may enhance safety, localize control of the concrete plant, and assist with troubleshooting. The control system may also enhance accuracy for determining an amount of mixed concrete dispensed, or amounts of concrete ingredients to dispense, and may eliminate the need for equipment used to verify the amount of mixed concrete or concrete ingredients dispensed.

12 Claims, 16 Drawing Sheets

(56) References Cited

U.S. PATENT DOCUMENTS

| | | | |
|---|---|---|---|
| 5,895,116 | A | 4/1999 | Kreinheder et al. |
| 5,975,747 | A | 11/1999 | Flaherty |
| 6,042,259 | A | 3/2000 | Hines et al. |
| 6,224,250 | B1 | 5/2001 | Kreinheder et al. |
| 6,499,517 | B2 | 12/2002 | Hansen |
| 6,535,830 | B2 | 3/2003 | Ruesch et al. |
| 6,782,327 | B2 | 8/2004 | Nishijima |
| 6,811,301 | B2 | 11/2004 | Packard |
| 6,876,904 | B2 | 4/2005 | Oberg et al. |
| 6,994,464 | B2 * | 2/2006 | Villwock et al. ............ 366/136 |
| 7,050,886 | B2 | 5/2006 | Oberg et al. |
| 7,458,399 | B2 | 12/2008 | Breithaupt |
| 7,530,728 | B2 * | 5/2009 | Rosaen .......................... 366/17 |
| 2005/0276153 | A1 * | 12/2005 | Gordon ............................ 366/6 |
| 2007/0185636 | A1 * | 8/2007 | Cooley et al. ................. 701/50 |
| 2009/0037026 | A1 * | 2/2009 | Sostaric et al. .............. 700/265 |
| 2009/0231949 | A1 * | 9/2009 | Rosaen .......................... 366/19 |
| 2009/0292572 | A1 * | 11/2009 | Alden et al. ...................... 705/7 |
| 2010/0127476 | A1 * | 5/2010 | Gembala ...................... 280/400 |
| 2010/0243576 | A1 * | 9/2010 | Fout et al. ................... 210/726 |
| 2010/0312406 | A1 * | 12/2010 | Cooley et al. ............... 700/285 |
| 2011/0004333 | A1 * | 1/2011 | Andersen .................... 700/103 |

OTHER PUBLICATIONS

Ace-Co, Ace-Co Scorpion—Automatic Batch Controller, www.ace-co.com/products/scorpion, 1 p., accessed Jun. 22, 2009.
Ace-Co, Complete Dispatch Control, www.ace-co.com/products/dispatch, 2 pp., accessed Jun. 22, 2009.
Ace-Co, Ace-Co Deltawave—Moisture Monitoring, www.ace-co.com/products/deltawave, 1 p., accessed Jun. 22, 2009.
Actaris Metering Systems, Batchmate 1500™ Batch Control Computer Technical Bulletin, 6 pp., 2002.

* cited by examiner

CONCRETE MATERIAL DISPENSING SYSTEM

RELATED APPLICATIONS

This application claims priority as a continuation-in-part to U.S. patent application Ser. No. 12/470,671 titled Concrete Material Dispensing System and filed on May 22, 2009, which claims priority under 35 U.S.C. §119(e) to U.S. Provisional Application No. 61/055,647 titled Concrete Material Dispensing System and filed on May 23, 2008, both of which are fully incorporated by reference herein.

TECHNICAL FIELD

Control and monitoring systems for concrete plants including admixture formulation and dispensing.

BACKGROUND

Concrete plants dispense concrete ingredients, mixed concrete, or both, either individually or combined, depending on their design. Different types of concrete plants satisfy different needs and are used according to a variety of conditions, including the availability of raw materials for concrete, where the concrete is to be used, how much concrete is needed, and environmental concerns, to name a few.

One type of concrete plant dispenses mainly admixtures used in concrete recipes. Admixtures are materials, other than cement, aggregate, fibers, fines, and water, used to make concrete. Admixtures may be added to a concrete batch before or during the mixing period and are used to alter the properties of the fluid concrete, the set concrete, or both. Common admixtures include retardants, accelerators, plasticizers, water reducers, air-entrainers, colorants, and shrinkage reducers. To ensure a high quality finished concrete, an admixture and its constituents should be accurately measured according to the concrete batch recipe, that is, relative to the measured amounts of the other ingredients constituting a batch of concrete.

Other types of concrete plants dispense dry materials such as aggregate, fines, and cement and the water and admixtures are added to the concrete at the job site. Yet other concrete plants dispense dry materials as well as water, admixtures, or both, for example, the materials may be deposited into a vehicle equipped with a mixer, or into a mixing chamber at the plant. Concrete plants of the various types may be stationary, designed to be moved relatively easily, or may be portable.

Concrete plants are typically integrated systems employing numerous components. Silos or bins are commonly used to store aggregate, fines, and cement. Tanks store water. Other tanks store premixed admixtures or admixture raw components (collectively "admixtures") used for various concrete recipes. Conveyors, cranes, chutes, pipes and pumps, or other equipment is commonly used to fill the silos, bins, and tanks, as well as move concrete ingredients from their storage places to dispensing or mixing equipment. Measuring equipment is used to weigh or otherwise measure the amount of ingredients used for a concrete batch when the ingredients are moved from their storage places to dispensing or mixing equipment. Various hoses, pipes, valves, sensors, and sources of pressurized fluids are commonly used to move ingredients, operate pumps, and perform other tasks for a concrete plant.

Current Concrete Plant Operations

Concrete plant operators commonly design or receive building specifications for a batch of concrete. Building specifications may be standardized depending on the use for the concrete, or may be customized for particular concrete projects. Building specifications typically provide requirements for the properties of a batch of concrete, such as the minimum compressive strength when cured, the slump when wet, the amount of water permeability for the cured concrete, color, etc. Creating batches of concrete that meet the building specifications commonly requires a batch recipe calling for a mixture of ingredients including cement, aggregates, water, and admixtures. Using admixtures in a concrete batch recipe provides a wider range of properties, for both the wet concrete and the cured concrete, than using cement, aggregates, and water alone.

Meeting building specifications commonly requires a precise amount of admixtures to be added to a given ratio and amount of cements, such as Portland cement type I-IV, fly ash, and other cement materials, aggregates, and water. Therefore, companies that manufacture admixtures have developed application specific admixture recipes, where various admixture recipes are used with basic concrete recipes (that is, recipes for the amount of cements, aggregates, and water) to alter the properties of the basic concrete recipes to meet standardized building specifications, such as a department of transportation's building specification for concrete used for highway construction. Of course, meeting specialized building specifications requires developing a customized admixture recipe.

Using admixtures commonly requires complex calculations. Customized admixture recipes require accounting for the unique building specifications as well as the materials used to create the concrete. But, even application specific admixture recipes commonly need to be modified because of variables such as the temperature and moisture content of the materials used to make a batch of concrete, environmental factors such as temperature and humidity, and the type of materials available (such as the type or source of cements, or the type or source of aggregates) for making a batch of concrete. However, admixtures are commonly pre-mixed before delivery to a concrete plant and therefore admixtures are not typically modified.

To create a concrete batch meeting the requirements for a building specification, concrete plant operators commonly call or send an electronic message with the building specifications to an admixture company. Currently, admixture companies typically call or send an electronic message to the concrete plant providing the types and amounts of admixtures needed to meet the building specifications. Depending on the type of batch panel a concrete plant has, the concrete plant operator either inputs the admixture recipe into a batch panel computer, or operates the batch panel to dispense the types and amounts of admixtures in the recipe.

Existing batch panels include a range of electronic sophistication from logic circuits that generate continuous-time electrical signals to operate concrete plant equipment, to computerized systems employing antiquated, out-of-date computer systems, to modern computer systems. Existing batch panels therefore create a range of signals from continuous-time electrical signals, for example, signals having various frequencies, waveforms, or both, to digital signals including digital signal formats used by various computer systems.

Concrete plant operators use the batch panel to control concrete plant equipment to implement concrete recipes. For example, a batch panel with logic circuits is commonly used to implement a basic concrete recipe as well as an admixture recipe by the operator toggling various switches for amounts of time that depend on the concrete recipe being implemented. A batch panel with logic circuits typically provides little to no feedback regarding the operational status of the concrete plant equipment aside from a light or other sign that a switch is in an "on" position. Computerized batch panels commonly receive both a basic concrete recipe and an admixture recipe from the operator and the computer operates concrete plant equipment to dispense the materials, including admixtures (which are typically pre-mixed admixtures), needed to create the concrete recipe. Because of the computerization, such batch panels may receive limited feedback regarding the operational status of the concrete plant equipment, for example, the number of pulses from a flow meter. However, because there is typically one batch panel and numerous pieces of equipment, computerized batch panels currently require large amounts of wiring between the batch panel and the equipment. And, depending on the computer's capabilities, the amount of information the batch panel can handle may be limited. Intensive wiring, limited computing capability, or both, may limit the amount of control, monitoring, and feedback a batch panel can provide.

SUMMARY

The inventors have determined that regardless of the type of concrete plant or batch panel, many components in a concrete plant may be controlled, monitored, or both, by distributed intelligent controllers. Distributed intelligent controllers preferably control operation of concrete plant equipment to implement concrete recipes and may record or learn the operational characteristics of the concrete plant. Knowing the history of how a component has operated, or how several components have operated and interacted with one another, may assist a concrete plant operator, admixture company, or other suitable entity in knowing what equipment is working when and how, how much inventory is on hand, that is, how much of each material such as admixtures, concrete, and aggregate, is available, the usage rate of each material, the life expectancy for equipment before replacement or repair is needed, and how to troubleshoot equipment to discover the source of a concrete plant problem.

Various embodiments described below focus on different aspects or components of concrete plants. Some embodiments relate to control systems, and in a particular embodiment to a control system with distributed control aspects that includes field boxes to send, receive, generate codes, or all three, related to concrete plant operations. In one embodiment, field boxes are preferably printed circuit boards contained in a housing and having various components including, but not limited to, a programmable device such as a processor, solid state switches, and communication ports. The signals, codes, or both preferably relate to operating various concrete plant components, reporting the status of various components, determining whether errors are occurring or have occurred for various components, tracking and predicting maintenance needs for various components, tracking and predicting material replenishment needs, providing alarms, and other concrete plant operations.

Some embodiments relate to synchronizing the control system elements to ensure that message traffic does not collide, resulting in missed messages. Synchronizing the control system elements preferably permits elements to be added and removed from the control system without affecting operation of other elements in the control system.

Further embodiments relate to communication between the field boxes and a master controller, and specifically to switching between wireless communication and wired communication when the ability to communicate wirelessly, or over the wired link, is lost.

Yet other embodiments are directed to detecting an admixture flow loss between a pump and a mixing chamber. Such flow loss may be due to a leak in the hose between the pump and the mixing chamber. Such an embodiment preferably recognizes when an admixture is deficient because not all of the admixture materials were delivered to a mixing tank. Such an embodiment may also help minimize environmental concerns created by leaking admixtures into the environment.

In another embodiment, dispensing components are tested and monitored by field boxes to determine whether the components are operating within expected operational ranges when mixed concrete, concrete ingredients, or both, are dispensed. The past operational characteristics of the dispensing components is preferably determined and used by the field boxes to learn the expected future operational characteristics for the dispensing components without pre-programming the field boxes. Alternately, the field boxes are pre-programmed with expected future operational characteristics for dispensing components. The expected future operational characteristics are preferably used as an expected measuring specification to determine the amount of admixture, other concrete ingredients, or both, dispensed into a tank, mixer, or vehicle.

Another embodiment relates to equipment inventory and uses unique identification codes stored in radio frequency identification devices (RFID) attached to concrete plant components and other equipment. A controller or data gathering device transmits information and information stored in the RFID code either wirelessly or over a wired connection to a processor with a memory for tracking inventory such as concrete plant components, for example, but not limited to, pumps, meters, and valves, for equipment inventory tracking and management.

Another embodiment relates to an animator for trouble shooting, concrete plant operations monitoring, concrete plant operations analysis, or other functions. The animator preferably uses information, such as operational codes, stored by a data recorder, a modified data recorder, an off-site computer, or both, and preferably receives operation, alarm, and error codes transmitted by field boxes. A data recorder or computer preferably stores the codes in a file that is interpreted by the animator to play back the processes that occurred during the concrete plant operation. The interpreted codes are preferably graphically displayed as an animation to permit concrete plant operators to analyze and understand what processes, alarms, and errors occurred. Other embodiments relate to an animator operating on a handheld device for playing back the processes and errors and providing recommendations based on the processes, alarms, and errors that occurred.

Other embodiments relate to transmitting building specifications to a batch computer and translating recipes from the batch computer to digital files readable by a master controller and implemented, at least in part, by distributed intelligent controllers. The master controller preferably decodes the recipe files from the batch computer and sends the translated recipes to the distributed intelligent controllers to operate concrete plant equipment to create a concrete batch based on the recipe from the batch computer. Other embodiments relate to the master controller translating messages, operations, alarms, and errors reported by the distributed intelligent controllers and sending the translated messages to the batch computer.

Additional aspects and advantages will be apparent from the following detailed description of preferred embodiments, which proceeds with reference to the accompanying drawings.

DETAILED DESCRIPTION OF PREFERRED EMBODIMENTS

Throughout the disclosure, references to a concrete plant include facilities where concrete is manufactured, made, assembled, mixed, or dispensed, as well as facilities that manufacture, make, assemble, mix, or dispense ingredients for use in concrete, including, but not limited to admixtures, aggregate, fines, cement, and water. References to a concrete plant also include facilities that are similar in function, construction, or operation to a concrete plant, but are not concrete plants, for example, asphalt or other paving plants, granaries, or other suitable facilities. While exemplary embodiments are described with respect to dispensing admixtures at a central-mix concrete plant, such as concrete plant 90 (FIG. 3), it is intended that similar control systems could be used with other types of concrete plants, with multiple concrete plants, and with concrete recipes including ingredients other than admixtures as well as with concrete recipes having no admixtures.

Intelligent Controller Concrete Plant Retro-Fit

Figure 1:
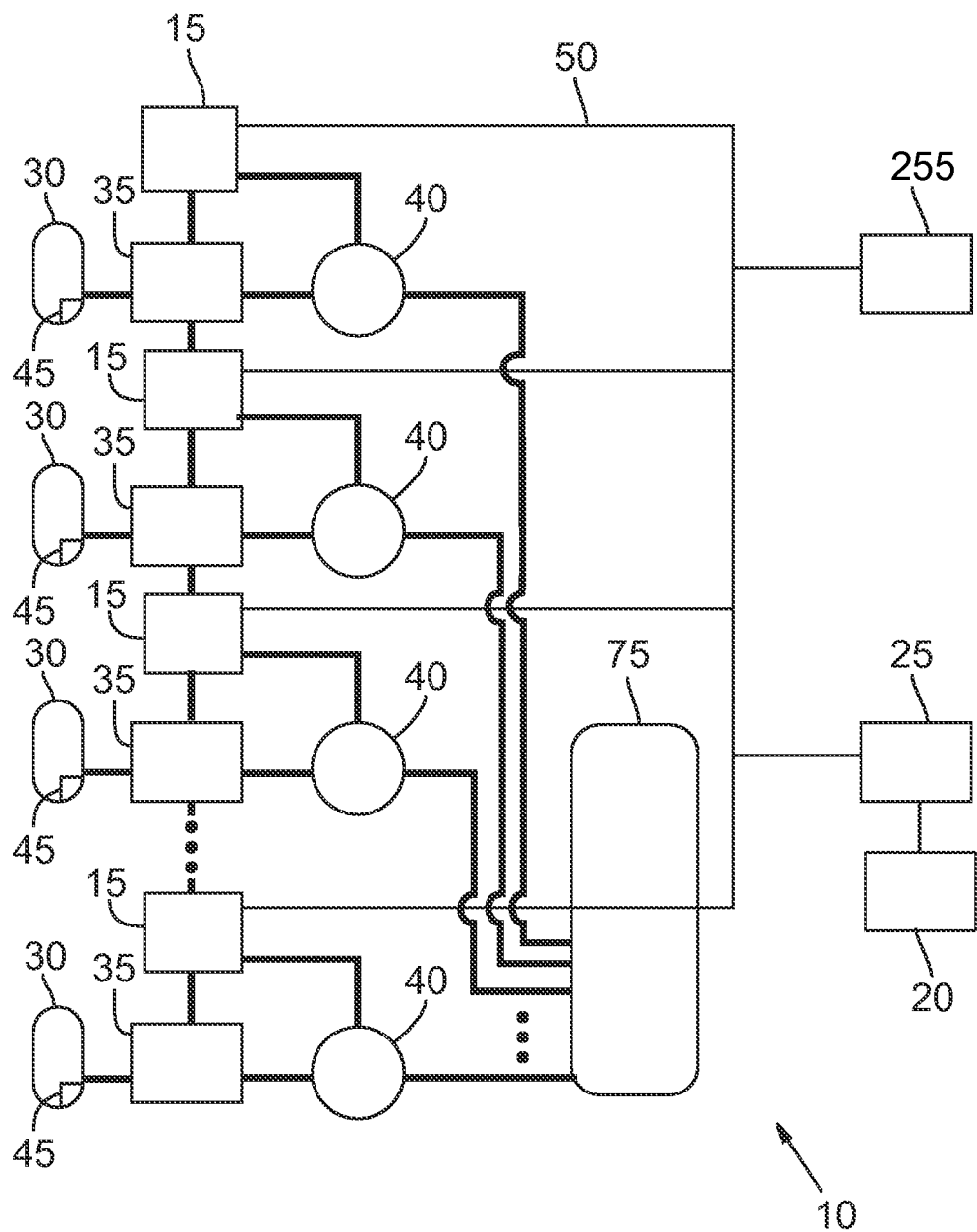
FIG. 1 is a schematic illustration of a control system for concrete plants.
Figure 1A:
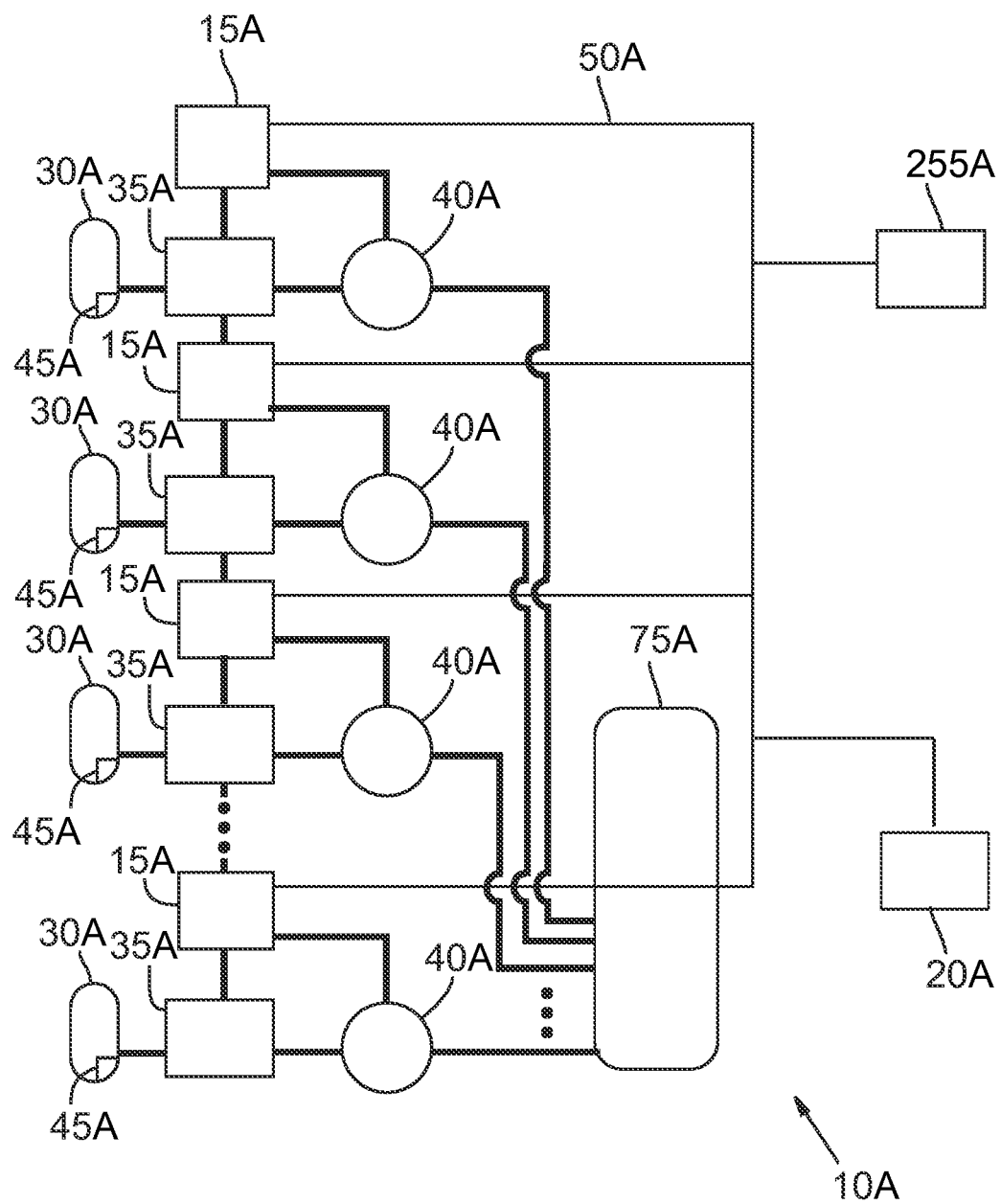
FIG. 1A is another schematic illustration of a control system for concrete plants.

FIG. 1 schematically illustrates an embodiment of a system for retro-fitting, or upgrading, an existing concrete plant 10 to include distributed intelligent controllers, such as field boxes 15, to control and monitor concrete plant equipment, regardless of the existing batch panel 20. FIG. 1A schematically illustrates another embodiment of a system for retro-fitting, or upgrading, an existing concrete plant 10A to include distributed intelligent controllers, such as field boxes 15A, to control and monitor concrete plant equipment, regardless of the existing batch panel 20A.

With reference to FIG. 1, providing distributed intelligent controllers, such as field boxes 15, preferably enables a concrete plant 10 to increase concrete batch repeatability, operate with improved safety, or monitor and record plant operations. The following discussion is made with reference to a master controller 25 that instructs field boxes 15 to control equipment to implement an admixture recipe, however the master controller 25 may be configured to instruct distributed controllers, such as field boxes 15, to control equipment and implement a concrete recipe without admixtures, or to implement a concrete recipe including admixtures and cements, aggregates, and water.

Concrete plant 10 includes four tanks 30 to hold admixtures. More or fewer tanks may be included. Each tank 30 has an associated pump 35 and flow meter 40, and preferably a level sensor 45 that generates signals or codes relating to the amount of fluid in each tank 30. Signals and codes are described in greater detail below. A field box 15, or other suitable intelligent controller, is also associated with each tank 30. Each field box 15 preferably communicates with, controls, or both, concrete plant 10 equipment associated with the same tank 30, such as a pump 35, flow meter 40, and level sensor 45. Each field box 15 is preferably located proximate the equipment it communicates with, controls, or both, thus reducing or eliminating the need for relatively long runs of wire between each piece of equipment and its controller.

The field boxes 15 communicate with one another over an electronic interface 50, preferably a controller-area network bus interface ("CAN-bus"). Communications between field boxes 15 is further described below. The master controller 25 communicates with the electronic interface 50, and thus with each field box 15. The master controller 25 also communicates with the batch panel 20. For example, the master controller 25 is preferably directly connected to the batch panel 20 by plain wiring, USB, Ethernet, SCSI, Zigbee®, BlueTooth®, RS485 or RS232 protocol, or other suitable communication connection. The master controller 25 preferably serves as a translator, permitting instructions from the batch panel 20 to be communicated to the field boxes 15 over the electronic interface 50. For example, if the batch panel 20 contains logic circuits and transmits signals as continuous-time electrical signals, that is, analog signals, the master controller 25 receives such continuous-time electrical signals and converts them to a format for transmission over the electronic interface 50. Thus, distributed intelligent controllers, such as field boxes 15, are added to existing concrete plants 10 without replacing the batch panel 20, and without extensive wiring connected between the concrete plant equipment and a centralized controller. In preferred embodiments, the master controller 25 translates the signals received from the batch panel 20 to CAN-bus signals for transmission over the electronic interface 50, which is preferably a CAN-bus. The field boxes 15 preferably include a programmable device, such as a processor, capable of receiving and acting on the CAN-bus signals. Field boxes are described in greater detail below.

As described in further detail below, the field boxes 15 preferably control operation of the concrete plant equipment, such as pumps 35, flow meters 40, and level sensors 45, as well as report on the operational status of each piece of equipment. Adding distributed, intelligent controllers, such as field boxes 15, to a concrete plant 10 preferably permits intelligent operation of the current concrete plant 10 at a local level, that is, intelligent decisions regarding equipment operations preferably occurs at a location proximate individual pieces of equipment. Such localized control preferably permits rapid decisions to be made by the intelligent controllers based on equipment operating parameters without delays commonly associated with relatively long communication paths where messages and instructions may become lost or delayed, queued decision making by a centrally located computer, or human error, such as misinterpreting or not seeing an error message. Preferably, intelligent controllers, sensors, and a master controller are all that is required to add to an existing concrete plant 10 to enable distributed intelligent control of the plant 10.

The master controller 25 may include a programmable logic device and a memory to record operational parameters of the equipment, or may be connected to a computer or other suitable device for tracking the operational parameters of the concrete plant equipment. Recording operational parameters is described in greater detail below.

With reference to FIG. 1A, providing distributed intelligent controllers, such as field boxes 15A, preferably enables a concrete plant 10 to increase concrete batch repeatability, operate with improved safety, or monitor and record plant operations without a master controller, such as master controller 25 (FIG. 1). The following discussion is made with reference to field boxes 15A that control equipment to implement an admixture recipe, however the field boxes 15A may be configured to control equipment and implement a concrete recipe without admixtures, or to implement a concrete recipe including admixtures and cements, aggregates, and water.

Concrete plant 10A includes four tanks 30A to hold admixtures. More or fewer tanks may be included. Each tank 30A has an associated pump 35A and flow meter 40A, and preferably a level sensor 45A that generates signals or codes relating to the amount of fluid in each tank 30A. A field box 15A, or other suitable intelligent controller, is also associated with each tank 30A. Each field box 15A preferably communicates with, controls, or both, one or more of concrete plant 10A equipment associated with the same tank 30A, such as a pump 35A, flow meter 40A, and level sensor 45A. Each field box 15A is preferably located proximate the equipment it communicates with, controls, or both, thus reducing or eliminating the need for relatively long runs of wire between each piece of equipment and its controller.

The field boxes 15A may communicate with one another over an electronic interface 50A, for example, as described above, but in a preferred embodiment field boxes 15A communicate with the batch panel 20A over an electronic interface 50A that includes one or more strands of ordinary copper wire. Each field box 15A includes hardware, firmware, software, or other suitable programming to perform some or all of the functions performed by a master controller, such as master controller 25 (FIG. 1). Each field box 15A preferably directly receives instructions from the batch panel 20 via the electronic interface 50A, for example, in the form of electrical pulses sent over a wire, and implements such instructions. Preferably, each field box 15A receives different instructions via the electronic interface 50A, but one or more field boxes 15A may receive the same instructions.

For example, if the batch panel 20A contains logic circuits and transmits signals as continuous-time electrical signals, that is, analog signals, each field box 15A receives such continuous-time electrical signals, for example via wire strands connected between the batch panel 20A and a particular field box 15A, and converts such signals to a format for implementation. Thus, distributed intelligent controllers, such as field boxes 15A, are added to existing concrete plants 10A without replacing the batch panel 20A, and without replacing existing wiring connected between the concrete plant equipment and a centralized controller, such as batch panel 20A. An exemplary field boxes 15A preferably includes hardware, such as an optical isolator for sensing the presence or absence of a voltage or sensing contact closures from sources emitting 90 to 140 VAC or DC voltages. Additional input circuitry preferably senses an "on" or "off" condition by sensing AC or DC voltage levels between 90-140 volts. The input circuitry is preferably designed with filtering on the input and a hysteresis amplifier for high noise rejection and relatively transient-free clean switching. An exemplary field box 15A preferably provides up to 4000 volts (transient) of optical isolation between the concrete plant equipment and a centralized controller, such as batch panel 20A, that are connected to the logic output to the microcontroller circuit or processor of the field box 15A. A field box 15A also preferably includes a programmable device, such as a microcontroller circuit or a processor, capable of receiving and acting on the signals transmitted by batch panel 20A regardless of whether such signals are analog or digital signals.

Like field boxes 15, the field boxes 15A preferably control operation of the concrete plant equipment, such as pumps 35A, flow meters 40A, and level sensors 45A, as well as report on the operational status of each piece of equipment. Adding distributed, intelligent controllers, such as field boxes 15A, to a concrete plant 10A preferably permits intelligent operation of the current concrete plant 10A at a local level, that is, intelligent decisions regarding equipment operations preferably occurs at a location proximate individual pieces of equipment. Such localized control preferably permits rapid decisions to be made by the intelligent controllers based on equipment operating parameters without delays commonly associated with relatively long communication paths where messages and instructions may become lost or delayed, queued decision making by a centrally located computer, or human error, such as misinterpreting or not seeing an error message. Additionally, intelligent controllers, such as field boxes 15A, may include batch panel functionality. For example, a field box 15A may be programmed such that local activation of a button on a field box 15A causes a preset amount of an admixture to flow into mixing bottle 75A. Preferably, intelligent controllers such as field boxes 15A are all that is required to add to an existing concrete plant 10A to enable distributed intelligent control of the plant 10A.

Field boxes 15A may include a programmable logic device and a memory to record operational parameters of the equipment, or may be connected to a computer or other suitable device for tracking the operational parameters of the concrete plant equipment.

Automating Recipes

Figure 2:
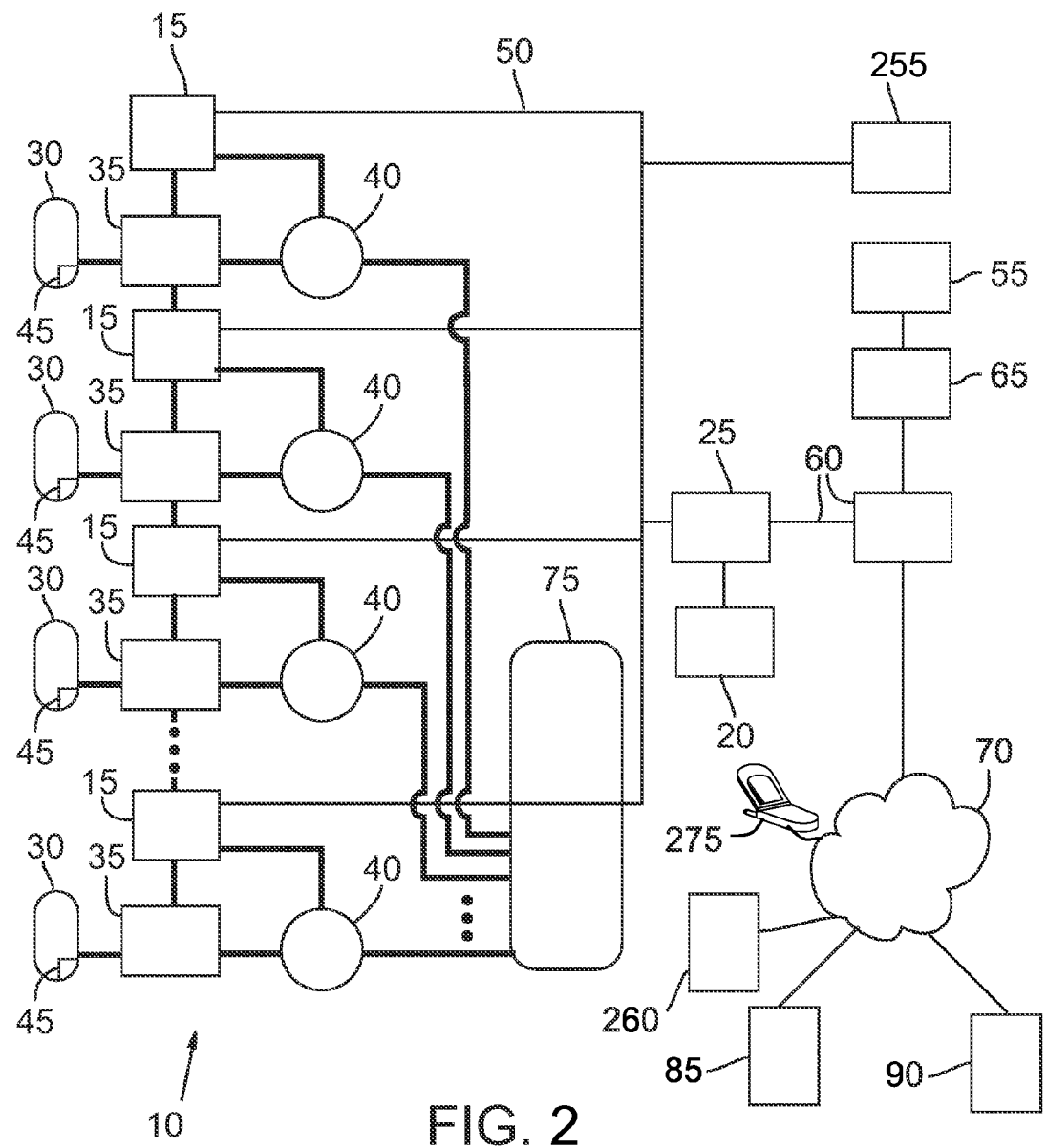
FIG. 2 is another schematic illustration of a control system for concrete plants.

FIG. 2 illustrates a schematic diagram for another embodiment where a system automates recipe implementation. Again, the embodiment is described with reference to automating an admixture recipe, but alternate embodiments may automate basic concrete recipes both with and without admixture recipes. Elements common between FIGS. 1 and 2 are given the same reference numeral.

In addition to the master controller 25 communicating with the batch panel 20 and the electronic interface 50, the master controller 25 communicates with a batch computer, or batch computer system, 55. Preferably, the master controller 25 communicates with the batch computer 55 over a second electronic interface 60, such as a USB, Ethernet, or other suitable interface.

Depending on the batch panel 20, the master controller 25 preferably receives building specifications from the batch panel 20, translates the building specifications into a format suitable for the second electronic interface 60, and transmits the translated building specifications to the batch computer 55. If the batch panel 20 cannot communicate building specifications to the master controller 25, a concrete plant operator preferably calls or sends an electronic message to an admixture company who inputs the building specifications into the batch computer 55.

Once the batch computer 55 receives the building specifications, software 65 running on the batch computer 55 preferably looks up an appropriate concrete batch recipe. An appropriate concrete batch recipe preferably includes a basic concrete recipe component and an admixture component. The concrete batch recipes may reside on the batch computer 55, or on a computer connected to a computer network 70, such as the Internet. Pre-existing concrete batch recipes may be used, or customized concrete batch recipes may be used, as described below.

The batch computer 55 transmits the concrete recipe to the master controller 25. In preferred embodiments, the master controller 25 translates the admixture recipe component of the concrete batch recipe into an appropriate format for the electronic interface 50, and transmits the translated admixture recipe to the field boxes 15. The master controller 25 also preferably translates the basic concrete recipe component to a format useable by the batch panel 20 and transmits the translated basic concrete recipe to the batch panel 20. The field boxes 15 preferably control concrete plant equipment to implement the admixture recipe while the batch panel 20 preferably controls other concrete plant equipment to implement the basic concrete recipe. Alternately, the master controller 25 may be connected to a printer, video display, or other suitable output device to permit an operator to read the basic concrete recipe and use the batch panel 20 to implement the basic concrete recipe, for example, when the batch panel 20 does not include a computer or other programmable device.

Each field box 15 also preferably monitors the equipment it is associated with and generates signals, codes, or messages relating to the operation of each associated piece of equipment. The signals, codes, or messages are transmitted over the electronic interface 50 to the master controller 25 where they are translated to a format appropriate for the second electronic interface 60 and transmitted to the batch computer 55. The batch computer 55 preferably stores the signals, codes, or messages relating to equipment operation and associates them with a time stamp, which may also be provided by each field box 15. The stored signals, codes, or messages and associated time stamps are preferably used to recreate operation of the concrete plate during a specified time period for troubleshooting or reporting purposes.

Concrete batch recipes can be stored as an Extensible Markup Language (XML) file, or may be translated into the XML format by the service 65 running on the batch computer 55 if not stored as an XML file. Alternately, the batch recipes may be stored on another computer connected to the batch computer 55 via a computer network 70. Thus, the batch recipes may be in a database operating on a computer that can be located anywhere on the computer network 70, such as the Internet. Formats other than XML are suitable for transmission between the batch computer 55 and the master controller 25 and may be used.

Once in the XML language, the recipe is transmitted to the master controller 25. The software that does this translation is preferably the service 65 running on the batch computer 55. The service program 65 preferably sends the appropriate commands to the master controller 25 to instruct the field boxes 15 to create the admixture for the appropriate concrete batch recipe. In a preferred embodiment, software on the master controller 25 receives the batch recipe in the XML language and interprets the batch recipe and converts the batch recipe into CAN-bus commands. The CAN-bus commands are sent, either wirelessly, or over a wired connection, as described below, to one or more field boxes 15. The field boxes 15 preferably activate actuators associated with the pumps 35 and flow meters 40 to deliver the admixture from the storage tanks 30 to a mixer, such as mixing bottle 75. In alternate embodiments, a field box 15 may activate actuators to deliver the amount of water a batch recipe calls for.

Alternately, in response to receiving the CAN-bus commands, one or more of the field boxes 15 may operate various actuators to measure and dispense the ingredients needed, for example, to create the entire batch recipe. For example, in addition to admixtures as described above, conveyor belts with weighing equipment may be used to move and measure the amount of aggregate, fines, and cement from their storage areas to a mixer. The mixer may be located in the concrete plant 10, or may be part of a vehicle (not illustrated). The field boxes 15 are preferably connected to electronic actuators and other controllers that operate equipment such as gates and chutes to deliver the concrete ingredients to conveyors, and thus to the mixer. Other equipment, such as, but not limited to, pipes used to convey air fluidized cement, may be used in alternate embodiments.

When messages are generated by the field boxes 15 during a batch recipe's implementation, or otherwise, the messages may be sent as CAN-bus codes to the master controller 25. Before the master controller 25 transmits the messages to the batch computer 55, the master controller 25 preferably translates the messages from CAN-bus format to XML so the batch computer 55 will be able to interpret and display the messages or recipe results of the concrete batch. The messages or the recipe results may be used to generate a quality report in the batch computer 55, for example, a report noting whether there were any errors and the amount of admixture dispensed compared to the amount the batch recipe called for.

In other embodiments, field boxes 15A may be used to perform the above-described functions instead of field boxes 15. When field boxes 15A are used, a master controller 25 may not be needed.

Exemplary Distributed Control System

Figure 3:
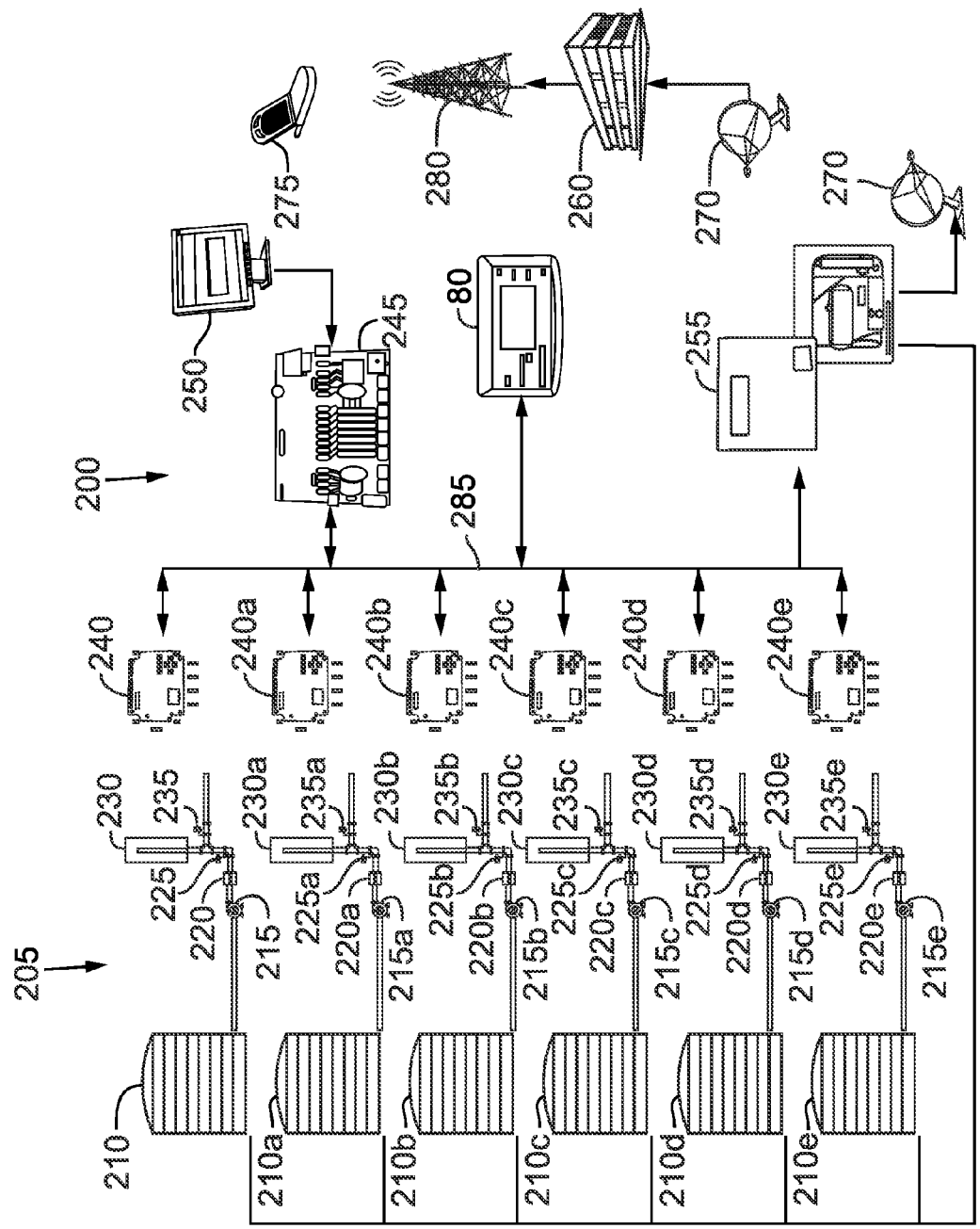
FIG. 3 is another schematic illustration of a control system for concrete plants.

Referring to FIG. 3, an exemplary control system 200 for a concrete plant 205 is illustrated. The concrete plant 205 includes a plurality of components such as storage tanks 210 through 210e, pumps 215 through 215e, meters 220 through 220e, fill valves 225 through 225e, measure tanks 230 through 230e, discharge valves 235 through 235e. The previously described components are useful for storing and dispensing fluid ingredients, such as premixed admixtures and admixture raw components (collectively "admixtures"), or water, used for making a batch of concrete. The concrete plant 205 may also contain other components (not illustrated) for storing, moving, measuring, and mixing other concrete ingredients such as aggregates, fines, and cement.

A batch of concrete may be made in another part of the concrete plant 205 (not illustrated), or may be made at a different concrete plant or at a jobsite. The batch of concrete may be dry, that is, have no water added, or may be hydrated. Admixtures or water from the concrete plant 205 are preferably added to the concrete batch either during mixing or after mixing, depending on the batch recipe.

Various admixtures are stored in the storage tanks 210 through 210e. The pumps 215 through 215e pump the admixtures out of the storage tanks 210 through 210e into the measure tanks 230 through 230e when the fill valves 225 through 225e are open. The meters 220 through 220e measure how much of each admixture is pumped into the measure tanks 230 through 230e. A single batch of concrete may not require admixture from all of the storage tanks 210 through 210e, but may use the admixtures from any storage tank 210 through 210e singularly or in any combination including all of the storage tanks 210 through 210e. The concrete plant 205 is not limited to six storage tanks 210, but may have any number of storage tanks 210. When any of the storage tanks 210 through 210e contain admixture raw components, the raw components are preferably dispensed and blended to create customized admixtures as described below.

When the meters 220 through 220e indicate that an appropriate amount of admixture has been pumped into the measure tanks 230 through 230e, for example, an amount of admixture called for by a concrete batch recipe, the fill valves 225 through 225e are closed and the pumps 215 through 215e are shut off. The measure tanks 230 through 230e preferably have a transparent window to permit visual confirmation of the amount of admixture in the measure tanks 230 through 230e. The amount of admixture in the measure tanks 230 through 230e is preferably confirmed using two methods. For example, the two methods currently used by many existing concrete plants involves obtaining readings from meters, such as meters 220 through 220e, and a visual inspection of the amount of fluid in a measure tank, such as a measure tank 230. Embodiments described below relate to improved methods for confirming the amount of admixture dispensed, either into measure tanks 230 through 230e or into another suitable receptacle. The discharge valves 235 through 235e are then opened and the admixture in the measure tanks 230 through 230e is discharged, for example, into a vehicle for transport to a jobsite. The vehicle may contain other ingredients such as cement, aggregate, fines, or water, or such ingredients may be added after the admixtures are deposited in the vehicle.

Each of the components in the concrete plant 205 preferably has a sensor or sensors associated with it. Associated sensors include sensors internal to a component, such as built in sensors, as well as external sensors either connected to or proximate a component. For example, the storage tank 210 preferably has a sensor inside the storage tank 210 for indicating the fill level, or amount of fluid in the storage tank 210. The pump 215 preferably has a sensor or sensors that send signals, codes, or both, related to pump 215 operating parameters such as when the pump 215 is on or off, whether there is a fill stroke when the fill valve 225 is opened, whether there are short pump strokes, whether there are missing pump strokes, whether the pump outlet pressure is above or below a minimum pressure per stroke, whether there is a very quick pump stroke, whether there is a very slow pump stroke, whether the average flow through the pump 215 is too high or too low, the total number of pump strokes, how may cycles the pump 215 goes through in a given time period, the amount of time for each cycle, and other operating parameters. Each of the operating parameters for the pump 210 preferably has a unique signal or code associated with it, and an intelligent distributed controller, such as a field box 240, processes the signals, codes, or both, to derive the parameters for the pump 215. For example, pump 215 may be a positive displacement pump or a metering pump that generates a signal when a pump stroke is completed, and a field box 240 may receive such signal. Because a positive displacement pump or a metering pump moves a known amount of fluid with each stroke, the field box 240 may derive a code from the signal where the code indicates an amount of fluid moved by the pump. Signals, codes, or both, are preferably transmitted to the field box 240 over a signal path such as one or more wires or cables, or a wireless connection, discussed in greater detail below. In alternate embodiments, the field box 240 controls the pump 215 and generate codes based on the operation of the pump 215. Field boxes 240 are described in more detail below.

Likewise, the meter 220 preferably has an associated sensor or sensors for sending signals, codes, or both, related to meter operating parameters such as whether a meter pulse is missing, whether a meter pulse exceeds the count rate, the meter pulse rate maximum, the meter pulse rate minimum, the meter pulse rate average, the number of meter pulses for a period of time, the total number of meter pulses, whether an amount of water or admixture greater than the measure tank 230 volume has passed through the meter 220, whether a measure tank 230 pressure probe provides a reading different from the meter 220, and other operating parameters. Each of the operating parameters for the meter 220 preferably has a unique signal or code associated with it, and a field box 240 preferably processes the signals, codes, or both, to derive the above parameters or other suitable parameters. In alternate embodiments, the field box 240 controls the meter 220 and generate codes based on operation of the meter 220.

The fill valve 225 preferably has an associated sensor or sensors for sending signals, codes, or both related to fill valve 225 operating parameters such as when the fill valve 225 is opened or closed, the amount of time the fill valve 225 is open, the maximum time the fill valve 225 has been open, the minimum time the fill valve 225 has been open, the average time the fill valve 225 has been open, the maximum pressure through the fill valve 225, the minimum pressure through the fill valve 225, the average pressure through the fill valve 225, the total number of fill cycles for the fill valve 225, whether the fill valve 225 is stuck in an open position, and other operating parameters. Each of the operating parameters for the fill valve 225 preferably has a unique signal or code associated with it, and a field box 240 preferably processes the signals, codes, or both to derive the above parameters. In alternate embodiments, the field box 240 controls the fill valve 225 and generates codes based on operation of the fill valve 225.

The measure tank 230 preferably has an associated sensor or sensors for sending signals, codes, or both, related to measure tank 230 operating parameters such as whether a zero low fill sensor is shorted or held low for more than a given time, such as 15 minutes, whether a zero high fill sensor is shorted or held low for more than a given time, such as 15 minutes, whether a measure tank 230 overfill probe is shorted, whether the measure tank 230 has been overfilled, whether a zero low fill sensor detected liquid when the fill valve 225 was opened, whether a zero high fill sensor detected liquid when the fill valve 225 was opened, whether a measure tank 230 overfill probe detected liquid when a test or calibration cycle was run, whether a zero low fill sensor detected liquid when a test or calibration cycle was run, whether a zero high fill sensor detected liquid when a test or calibration cycle was run, and other operating parameters. Each of the operating parameters for the measure tank 230 preferably has a unique signal or code associated with it, and a field box 240 preferably processes the signals, codes, or both, to derive the above parameters or other suitable parameters. In alternate embodiments, the field box 240 controls the measure tank 230 and generates codes based on the operation of the measure tank 230.

The discharge valve 235 preferably has an associated sensor or sensors for sending signals, codes, or both, related to discharge valve operational parameters such as when the discharge valve 235 is opened or closed, the amount of time the discharge valve 235 is open, the maximum time the discharge valve 235 has been open, the minimum time the discharge valve 235 has been open, the average time the discharge valve 235 has been open, the maximum pressure through the discharge valve 235, the minimum pressure through the discharge valve 235, the average pressure through the discharge valve 235, the total number of discharge cycles for the discharge valve 235, whether the discharge valve 235 is stuck in an open position, and other operating parameters. Each of the operating parameters for the discharge valve 235 preferably has a unique signal or code associated with it, and a field box 240 preferably processes the signals, codes, or both, to derive the above parameters or other suitable parameters. In alternate embodiments, the field box 240 controls the discharge valve 235 and generates codes based on the operation of the discharge valve 235.

In certain embodiments, the sensors associated with the pump 215, meter 220, fill valve 225, measure tank 230, and discharge valve 235 communicate with a field box 240 either over a wireless connection, for example, a radio-frequency system such as a Zigbee®, Bluetooth®, or other suitable communication system, via a wired connection, for example an electronic interface such as a CAN-bus, an $I^2C$ bus, SMbus, Universal Serial Bus, or other suitable electronic interface, or both. The field box 240 preferably contains, in addition to communication equipment, a programmable device, such as a microprocessor, a programmable logic device, or other suitable programmable device, and preferably includes a memory. The memory, if included, preferably has a non-volatile and a volatile component for storing field box programming and message codes, respectively.

In alternate embodiments, the components in the concrete plant 205 may not have associated sensors and may be directly controlled by a field box 240. For example, the field box 240 may control the operation of the pump 215, the fill valve 225, the discharge valve 235, or other components, through electronically controlled actuators that are operably connected to the various components. By directly controlling each component of the concrete plant 205, the field box 240 may know the operating condition and parameters of each component. When the field box 240 directly controls the components of the concrete plant 205, signals, codes, or both, relating to each component's operating parameters are preferably generated by the field box 240. Alternately, the field box 240 may control each component, and each component may include one or more associated sensors. The associated sensors, as well as the field box 240, may generate signals, codes, or both relating to operational parameters for the components. In one embodiment, sensors may be used to confirm whether an instruction from a field box 240 was successfully completed.

Each field box 240 through 240e preferably communicates with a master controller 245 over a wireless connection, via a wired connection, or both. In some embodiments, described in further detail below, field boxes 240 through 240e are connected to the master controller 245 over both wireless and wired communication channels. While six field boxes 240 are depicted and discussed, more or fewer field boxes 240 may be employed.

The master controller 245 receives or records, or both, messages, codes, or signals, or all three, originated by the field boxes 240. Signals, codes, or both, preferably originate from the various sensors, and are sent to the field box 240 where additional processing may occur, for example, to derive codes from the signals if sensors transmit signals, group the codes into messages, or both. Alternatively, signals, codes, or both, may be generated by the various field boxes 240 and may be processed, or grouped into messages, or transmitted as the raw codes. Then, the codes, messages, or both, are preferably transmitted from the field box 240 to the master controller 245 and on to a batch computer 250 in real time, or near to real time. The master controller 245 preferably performs any translations needed for the signals, codes, messages, or all three, transmitted by the field boxes 240 to be understood by the batch computer 250. An operator using the batch computer 250 is thus preferably informed of the current operating status of the components of the concrete plant 205 based on the signals, codes, or both, originating from the sensors for each component of the concrete plant 205, or generated by the field boxes 240, while the concrete plant 205 is operating. Code grouping and message transmission are described in further detail below.

The field boxes 240 through 240e are preferably wired together. In an exemplary embodiment where concrete plant 205 is a large plant with multiple storage tanks 210 through 210e, the field boxes 240 through 240e are wired together so that a message originating at an intelligent controller, such as field box 240e, is transmitted through each of the field boxes 240d, 240c, 240b, 240a, and 240 before being transmitted to the master controller 245. Such a wiring arrangement permits the field boxes 240 through 240e to communicate with one another without first transmitting a message through the master controller 245. The wireless communication between the field boxes 240 through 240e and the master controller 245 is preferably designed to enable each field box 240 through 240e to communicate with each of the other field boxes 240 through 240e as well as with the master controller 245.

In other embodiments, field boxes 15A may be used to perform the above-described functions instead of field boxes 240. When field boxes 15A are used, a master controller 245 may not be needed.

Communicating System Events, Warnings, and Error Messages.

Referring again to FIG. 3, the wireless and wired communication systems permit the field boxes 240 through 240e to communicate with the master controller 245. The master controller 245, in turn, communicates with the batch computer 250, which may be located at the concrete plant 205, or may be located at a remote site.

Signals or codes sent from the various sensors to the field boxes 240 through 240e, or generated by the field boxes 240 through 240e, result in a collection of codes at each field box 240. When codes are sent to the field boxes 240 through 240e, the field boxes 240 simply collect the codes. When signals are sent to the field boxes 240 through 240e, the field boxes 240 through 240e contain software, hardware, or a combination of software and hardware, to interpret the signals to determine from where each signal originated and what event each signal is related to. A corresponding code may then be derived by the field boxes 240 through 240e based on the received signal. When the field boxes 240 through 240e directly control the components of the concrete plant 205 and there are no sensors connected to or associated with the components of the concrete plant 205, the field boxes 240 through 240e preferably generate codes related to the operation of the components of the concrete plant 205 based on the field boxes 240 through 240e controlling the components of the concrete plant 205.

Each field box 240 through 240e is preferably equipped with a display 242 that displays the codes at the site where each field box 240 through 240e is located. The display 242 is preferably a part of each field box 240, but may be located proximate each field box 240 and communicate with each field box 240 over a wired or wireless connection. The display 242 preferably cycles through the most recently received, derived, or generated codes, or may simply display the latest code. Including a display 242 for each field box 240 through 240e permits on-site operators to recognize whether the concrete plant 205 is operating normally. For example, viewing a display 242 provides the operating status of equipment associated with a particular field box 240, or whether there is a warning or error based on the code(s) displayed.

As previously described, a field box 240 preferably generates, derives, or collects several codes, singularly or in any combination, and transmits them to the master controller 245 based on the codes. As discussed in more detail below, in certain embodiments a field box 240 transmits codes or messages, or both, to a data recorder to be recorded and forwarded to a message center 260. Preferably, a modified data recorder 255 that includes a programmable device and firmware queries field boxes 240, or sensors associated with concrete equipment, such as tank fluid level sensors, to obtain signals or codes. The modified data recorder 255 preferably has the capability to derive codes from signals, and to transmit the codes to a message center 260, for example. In other embodiments, for example, illustrated in FIG. 2, data recorder 255 transmits codes or messages, or both, to the batch computer 250 or to the message center 260, or both, which also records the codes or messages.

The message center 260, batch computer 55, or alternately, modified data recorder 255, or a computer communicating with computer network 70, preferably records the codes and creates operational records for the equipment associated with the codes. For example, equipment associated with a particular field box 240 may generate a series of codes. A code originated by a sensor associated with the pump 215 may indicate to the field box 240 that the pump 215 was turned on, and at what time. A subsequent code may indicate that the fill valve 225 opened, and another code may indicate how many meter pulses followed the fill valve 225 being opened. The next code may indicate that the high zero sensor 265 for the measure tank 230 detected admixture, and a subsequent code may indicate that the pump outlet pressure is below a minimum pressure per stroke. Upon receiving these codes, the field box 240 may create a message indicating that the pump 215 is having difficulty and needs to be checked immediately and send this message to the master controller 245. The master controller 245 may translate the message, if necessary, and transmit the message to the batch computer 250. Alternately, referring to FIG. 2, the batch computer 55 may transmit the message to a computer connected to the computer network 70, for example, a computer at the message center 260. The batch computer 250, 55 or a computer connected to the computer network 70 may store the message, preferably in a database. The field box 240 may also transmit the message to the data recorder 255, which transmits the message to the message center 260 over a communication system 270, such as a microwave, satellite, wired or a wireless telephone system, the internet, fiber optic or other suitable cable, or other suitable communication system. The message center 260 preferably transmits the message to a mobile device 275 over a second communication system 280. Alternately, referring to FIG. 2, a computer connected to the computer network 70 may transmit the message to a mobile device, such as mobile device 275, through the computer network 70.

Upon receiving the message, the batch computer 250 itself, or an operator viewing the message on the batch computer 250 or a mobile device 275, preferably transmits a message back to the field box 240 via the master controller 245 instructing the field box 240 to shut the pump 215 off. If the master controller 245 is not available, or no return message is received by the field box 240 in a certain amount of time, for example, the field box 240 may take action. For example, based on the codes described above, the field box 240 may shut off the pump 215 and generate and send a second message that the pump 215 has been shut off. Alternately, the field box 240 may shut off the pump 215 prior to transmitting any messages.

In other situations, the field box 240 may not wait to gather, derive, or generate a collection of codes before transmitting a message. For example, the field box 240 may receive, derive, or generate a code indicating that the fill pressure of the measure tank 230 is at its maximum. At the same time, the field box 240 may shut off the pump 215 and close the fill valve 225. The field box 240 may then transmit a warning message to the master controller 245, which may translate and route the message to the batch computer 250, the message center 260, or a computer connected to a computer network, such as network 70 (FIG. 2), any of which may transmit the message to a mobile device 275. The master controller 245 may also send a signal or command back to the field box 240.

By including an intelligent controller, such as the field boxes 240 through 240e, in close proximity to the equipment of a concrete plant 205, certain embodiments may enhance the operating safety of the concrete plant 205. The field boxes 240 through 240e preferably permit on-site operators to be aware of warning and error conditions before the conditions become critical, as well as inform off-site operators of the operating condition of the concrete plant 205. Many other system events, warnings, and errors may be recognized by the field boxes 240 through 240e. Depending on the nature of the system event, warning, or error, the field boxes 240 through 240e may create and transmit messages and cause appropriate actions to occur at the concrete plant 205 through electronic actuators or other suitable devices.

In other embodiments, field boxes 15A may be used to perform the above-described functions instead of field boxes 240. When field boxes 15A are used, a master controller 245 may not be needed.

Additional Communications.

Figure 4:
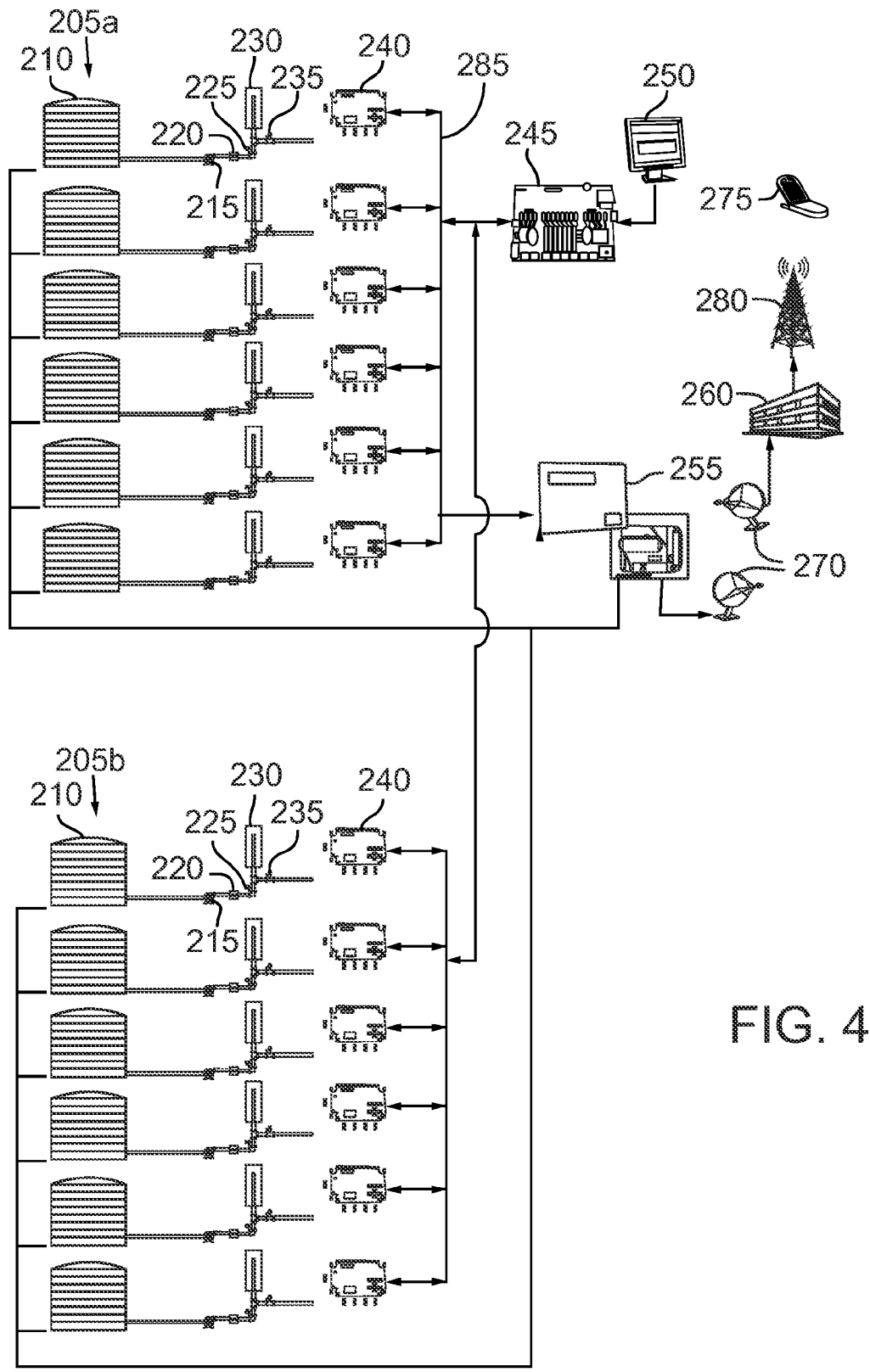
FIG. 4 is a schematic illustration of a control system for multiple concrete plants.

Referring again to FIG. 3, other embodiments may include additional communication capabilities. The storage tanks 210 through 210e preferably include an internal fill level sensor. The fill level sensor for each of the storage tanks 210 through 210e sends a signal to a data recorder 255, the field boxes 240 through 240e, or both. The field boxes 240 through 240e preferably also send the codes they receive, derive, or generate to the data recorder 255. In embodiments where there are multiple concrete plants 205, the data recorder 255 preferably associates codes and messages with a particular concrete plant 205. Referring to FIG. 4, for example, the fill level signal from the storage tanks 210 through 210e located in concrete plant 205b and the codes received from the field boxes 240 through 240e located in concrete plant 205b are preferably grouped together and associated with the concrete plant 205b. The recorded codes or messages are preferably used for troubleshooting to determine the root of warnings and errors for each of the concrete plants 205a and 205b as discussed in further detail below.

The data recorder 255 preferably communicates with the communication system 270. Alternately, communication may occur over an electronic interface 50, thorough a master controller 25, and through a computer network 70 to a message center 260 (FIG. 2). Groups of codes, individual codes, or messages associated with a particular concrete plant 205 are preferably transmitted by the data recorder 255 through the communication system 270. The communication system 270 transmits the codes or messages to the message center 260, which may be operated by an entity responsible for servicing the components of the concrete plant 205, or the field boxes 240 through 240e and the master controller 230 in the concrete plant 205, or both.

Either a computer system or personnel at the message center 260 preferably select one or more of multiple service technicians, for example, to notify regarding the codes or messages received from the data recorder 255. In the example discussed above where the pump 210 needed to be shut off, the message center 260 preferably transmits a message over a communication system 280 (which may be different from, or the same as, the communication system 270) to a mobile device 275 carried by or accessible to the selected service technician(s). The mobile device 275 then provides the selected service technician(s) an alert that the pump 215 has been shut off and needs to be serviced. Alternately, the message center 260 may communicate with the mobile device 275 through computer network 70 (FIG. 2).

The codes transmitted by the data recorder 255 are not limited to warnings and errors that require immediate attention. For example, with reference to FIG. 4, other codes, such as the total number of cycles a pump 215c in the concrete plant 205a has been operated, are transmitted as described above to a mobile device 275. A service technician, the batch computer 250, or the message center 260 preferably has a record of how many cycles the pump 215c has been operated for each month, and based on the total number of operation cycles compared to an average monthly number of operational cycles, the technician, the batch computer 250, or the message center 260 preferably determines when the pump 215c will need servicing. In some embodiments, such maintenance calculations may be performed by the mobile device 275. Similar information may be received by the mobile device 275 regarding the pump 215d in the concrete plant 205b, permitting the service technician to schedule a preventative maintenance service for the pump 215c in the concrete plant 205a and the pump 215d in the concrete plant 205b that accounts for the estimated time for such a preventative maintenance service, the geographic location of the concrete plant 205a compared to the geographic location of the concrete plant 205b, and the expected parts needed for each of the pumps 215c and 215d located at the two concrete plants 205a and 205b, respectively. Many other codes may be transmitted by the data recorder 255 for various actions by service technicians, sales representatives, or other personnel.

Referring to FIG. 4, other embodiments may have multiple concrete plants 205. In FIG. 4, concrete plants 205a and 205b contain similar components as concrete plant 205 (FIG. 3), such as storage tanks 210, pumps 215, field boxes 240, and etcetera. The master controller 245 preferably receives and monitor codes, messages, or both, from the plurality of concrete plants 205a and 205b. The master controller 245 preferably monitors any number of concrete plants 205, and routes messages or codes from the concrete plants 205 to a single batch computer 250. The concrete plants 205a and 205b may be located near one another, or may be geographically spread apart, for example, concrete plants 205a and 205b may be in two different states. Codes, warnings, errors, and other messages are preferably viewed and acted on by an operator at the batch computer 250, or by the batch computer 250 itself, or may be sent to personnel such as service technicians through the communication system 270, message center 260, communication system 280, and the mobile device 275 as described above.

Figure 5:
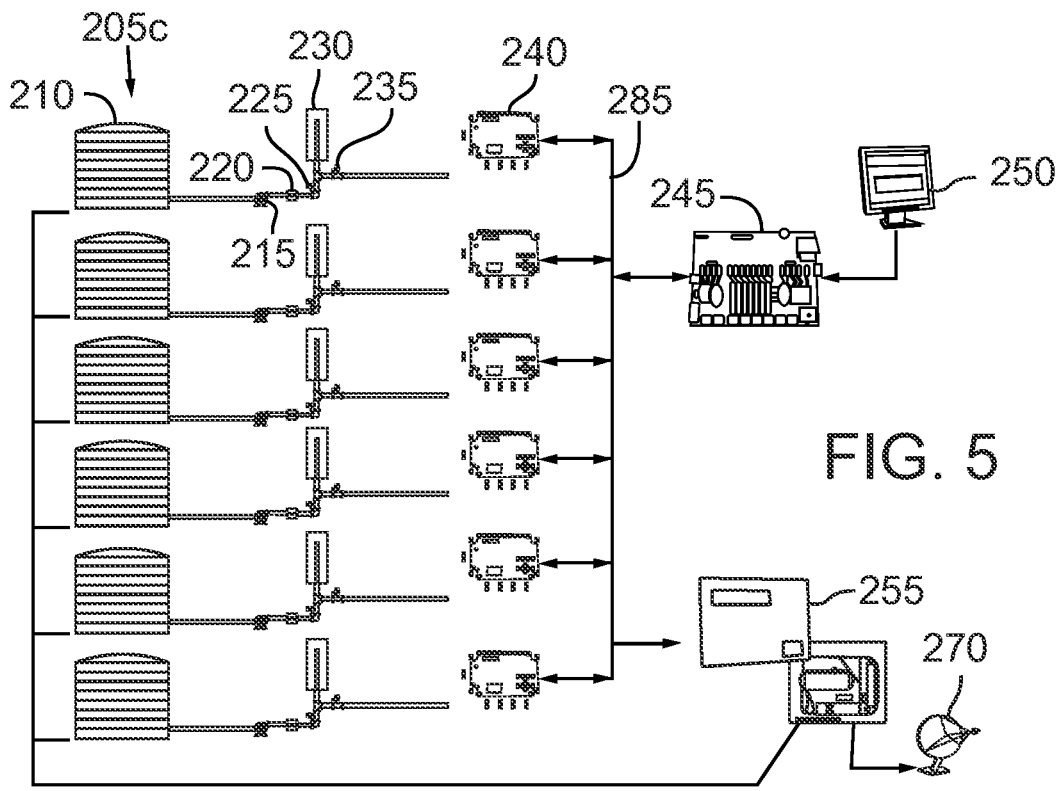
FIG. 5 is a schematic illustration of another control system for multiple concrete plants.
Figure 5:
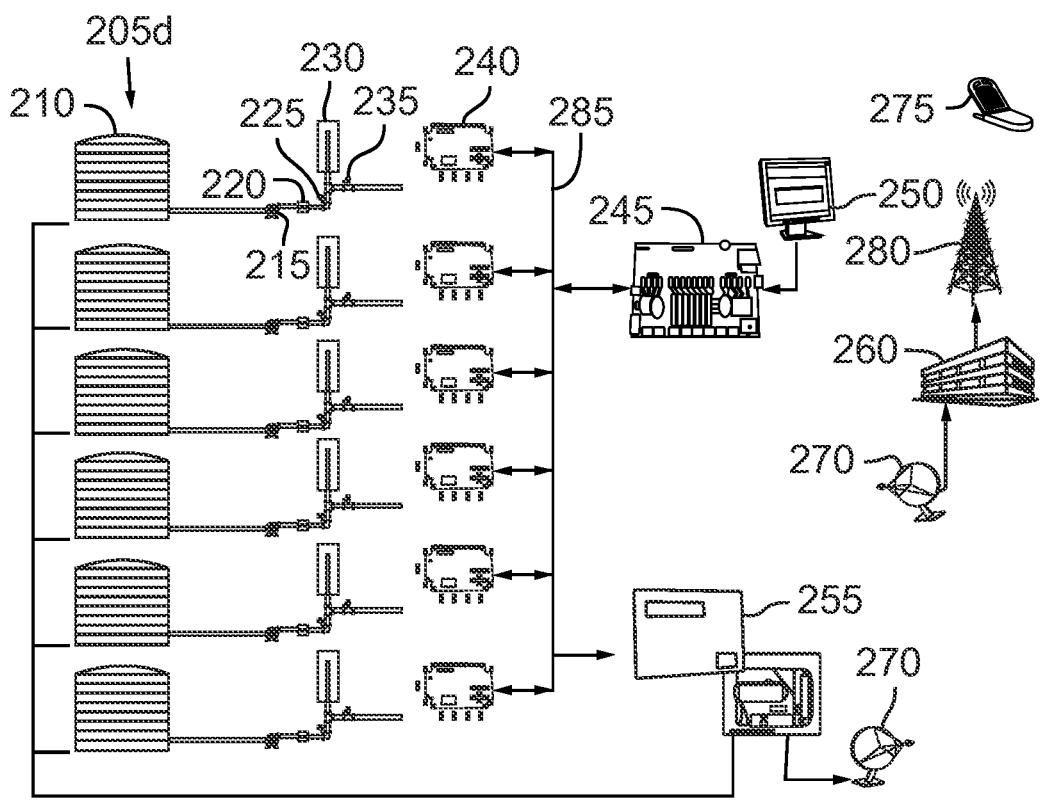

Referring to FIG. 5, another embodiment has multiple concrete plants that communicate with separate batch computers 250, but with one message center 260. Concrete plants 205c and 205d contain similar components as concrete plant 205, such as storage tanks 210, pumps 215, field boxes 240, and etcetera. Operation of the concrete plants 205c and 205d is similar to the operation of concrete plant 205, described above and below. A difference between the concrete plants 205c and 205d compared to the concrete plants 205a and 205b (FIG. 4) is that each of the concrete plants 205c and 205d has its own batch computer 250 to monitor and control operations at each of the concrete plants 205c and 205d. A similarity is that warnings, errors, codes, and other information related to the operations of the concrete plants 205c and 205d are transmitted to a single message center 260. Using a single message center 260 for multiple concrete plants 205 preferably allows notification of personnel, such as service technicians, of operating conditions at concrete plants 205 that are not related to one another. For example, if concrete plants 205c and 205d are operated by two different companies, but both companies purchase fill valves 225 and discharge valves 235 from the same supplier, that supplier may be notified of any incorrectly operating fill valves 225 or discharge valves 235 regardless of who purchased the fill valves 225 or the discharge valves 235.

In other embodiments, field boxes 15A may be used to perform the above-described functions instead of field boxes 240. When field boxes 15A are used, a master controller 245 may not be needed.

Wireless & Wired Handoff.

Including both wireless and wired communication links between the sensors connected to the components of the concrete plant 205 and the field box 240 may ensure that communication between the sensors and the field box 240 is not lost. For example, if a wired CAN-bus connection and a wireless connection, for example, using Zigbee®, exist between each sensor and the field box 240, data communication between the sensors and the field box 240 may be maintained in the event that one of the communication systems becomes unavailable. Should an electrical storm interfere with the wireless connection, the field box 240 is preferably programmed to recognize that the wireless communication system is unavailable and automatically switch all communications to the wired communication system. On the other hand, if a wire for the wired communication system should accidentally be severed, the field box 240 is preferably programmed to recognize that the wired communication system is not available and switch all communications to the wireless system.

Likewise, establishing both wireless and wired communication between the field boxes 240 through 240e and the master controller 245 helps ensures that communication between a field box 240 and the master controller 245 is not lost. Either the field boxes 240 through 240e, or the master controller 245, or both, are preferably programmed to recognize when a communication system is not available and switch to the remaining communication system.

In other embodiments, field boxes 15A may be used to perform the above-described functions instead of field boxes 240. When field boxes 15A are used, a master controller 245 may not be needed.

Synchronizing the Network

In certain embodiments the field boxes 240 through 240e are synchronized with the master controller 245 to control message traffic over the wireless communication system, the wired communication system, or both. Because some codes and signals transmitted to and from the field boxes 240 through 240e arise randomly, it is possible that two field boxes 240 may attempt to transmit a message to the master controller 245 at the same time, or that one field box 240 may attempt to transmit a message to a second field box 240 at the same time a third field box 240 attempts to transmit a message to the second field box 240. In such a situation, it may be possible for the messages to collide in the communication system and become lost, that is, not delivered. To prevent messages from colliding and possibly becoming lost, the field boxes 240 through 240e are preferably synchronized with one another and the master controller 245.

Figure 6:
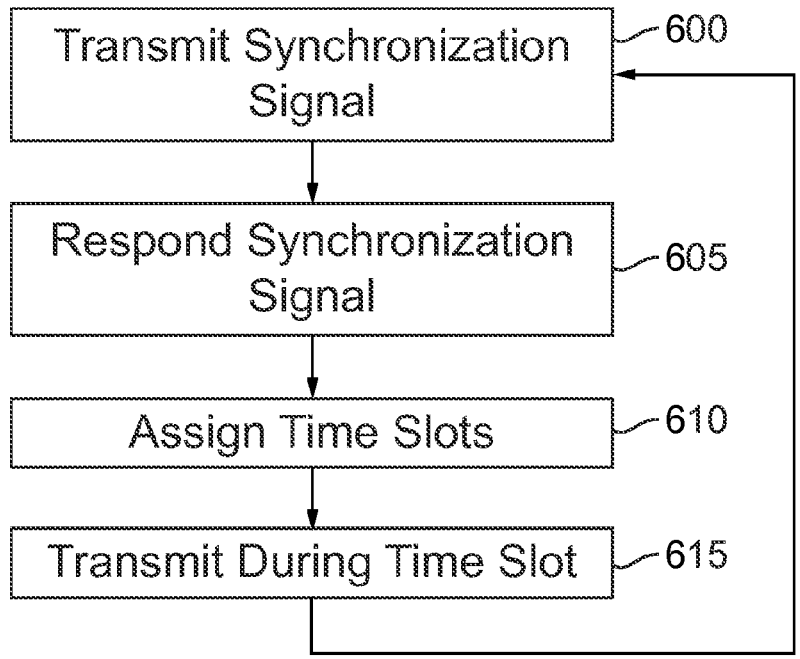
FIG. 6 is a flow chart for a method of synchronizing control system components.

Referring to FIG. 6, a method for synchronizing the master controller 245 and the field boxes 240 through 240e is described. At step 600 the master controller 245 transmits a synchronization signal to the field boxes 240 through 240e. The field boxes 240 through 240e respond to the synchronization signal by identifying themselves at step 605. At step 610 the master controller 245 assigns a time slot for each field box 240 to communicate. For example, the master controller 245 may divide one second into a number of time slots corresponding to the number of field boxes 240 and assign each field box 240 through 240e a portion of each second to transmit over. At step 615 each field box 240 through 240e transmits messages during its assigned time slot.

Alternatively, the master controller 245 may divide one second into a number of time slots greater than the number of field boxes 240. Each field box 240 through 240e would be assigned one time slot to transmit, leaving one or more time slots open. If a new field box 240f is added to the system, the next synchronization signal, which preferably occurs at regular intervals, preferably includes instructions to any field boxes 240 that do not have an assigned time slot to transmit using an open time slot. Using an open time slot for new field boxes 240 preferably allows the system to add, or remove, field boxes 240 without affecting the operation of the other field boxes 240.

The field boxes 240 through 240e preferably contain crystal clocks for accurate timing. Including an accurate timing capability in the field boxes 240 through 240e helps permit the field boxes 240 through 240e to transmit during their assigned time slot without drifting into another field box's assigned time slot between synchronization signals. The process of sending a synchronization signal, responding to the synchronization signal, assigning time slots, and transmitting during assigned time slots is iterative and repeats on a regular schedule, for example, once every five seconds. The iterative process preferably assists adding and removing intelligent controllers without affecting other components in the network.

In one embodiment, when field boxes 240 communicate with each other and with the master controller 245 there are four communications carried out in the time slot for a single field box 240. For example, the master controller 245 sends information, such as, but not limited to, fill and discharge information, to a field box 240 at the beginning of the time slot for the field box 240. The second communication may be an open communication where the field box 240 is permitted to communicate with any other device communicating through the electronic interface 285, such as a CAN-bus, including other field boxes 240 and the master controller 245. The third communication may be information sent from the field box 240 to the master controller 245, for example meter pulses for a meter communicating with the field box 240. The final communication may be a second open communication where the field box 240 is permitted to communicate with any other device communicating through the electronic interface 285. In other embodiments, different communication arrangements may be used.

In other embodiments, field boxes 15A may be used to perform the above-described functions instead of field boxes 240. When field boxes 15A are used, a master controller 245 may not be needed.

Animation

Figure 7:
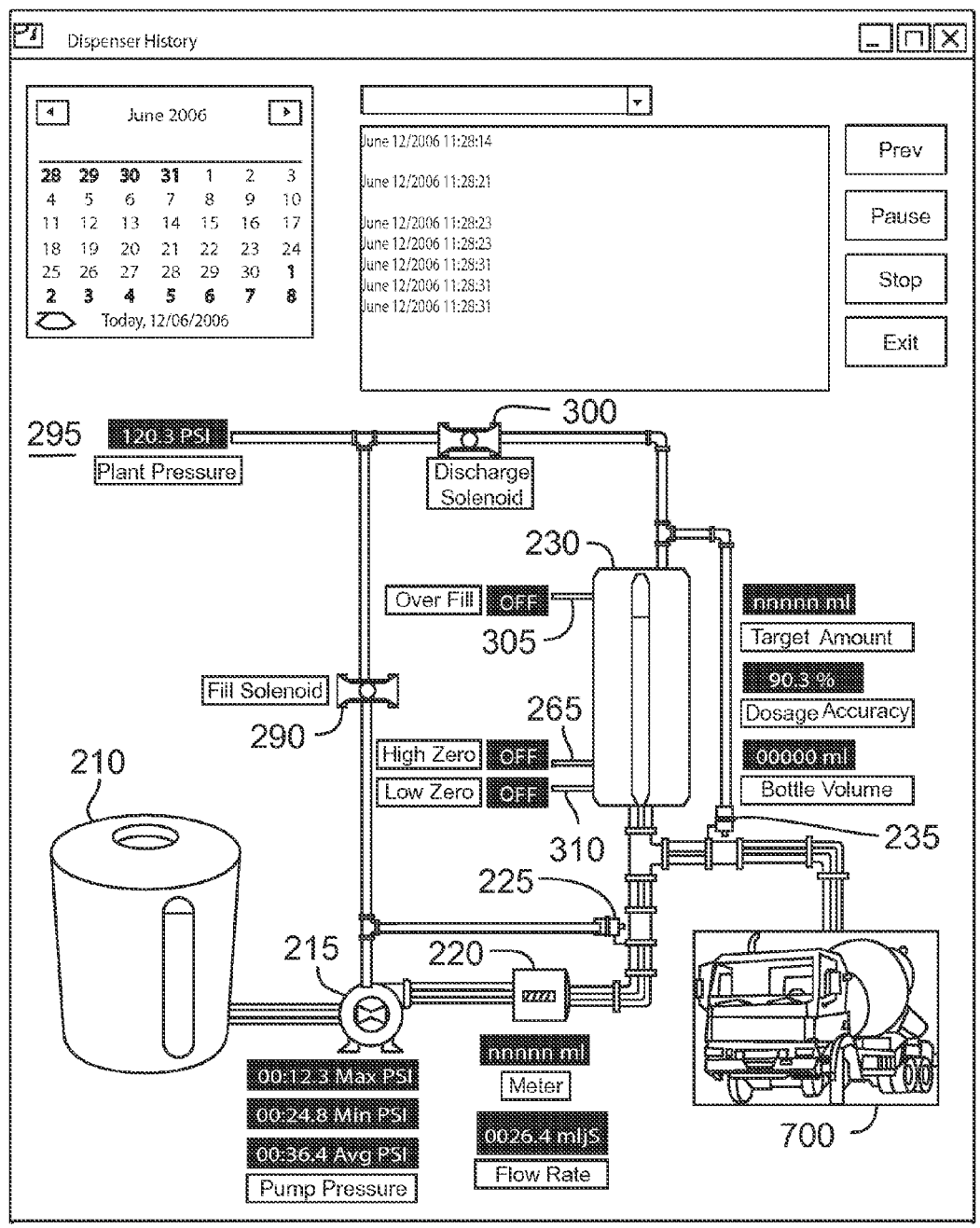
FIG. 7 is a screen shot of an animation based on concrete plant operation codes.

Referring now to FIGS. 3 and 7, troubleshooting for a concrete plant 205 is described. The data recorder 255 records the codes, messages, or both, received from the field box 240 as the concrete plant 205 operates. At some point during the operation of the concrete plant 205 an operational or equipment malfunction may occur prompting an error code to be generated. For example, the fill solenoid 290, which controls operation of the fill valve 225, may generate a signal or code indicating that there is a fill solenoid sticky valve, low air. When the plant air pressure 295 is checked by a technician, it may be above the minimum pressure for the concrete plant 205, for example 45 pounds of pressure per square inch (psi). The fill solenoid 290 may also appear to be in proper working condition.

To help solve why the error code was generated, a technician may run an animation of the concrete plant 205 on a computer, including a portable computer device 80. The animation, of which a screen shot is represented in FIG. 7, is preferably based on the codes for the concrete plant 205 recorded by the data recorder 255. For example, the data recorder 255 transmits to a mobile device 275 the codes for a half hour period before the fill solenoid sticky valve, low air code was generated and for 15 minutes after the fill solenoid sticky valve, low air code was generated. Preferably, the software for creating the animation of the concrete plant 205 is stored on the mobile device 275, but the software may be transmitted with the codes in certain embodiments. Alternatively, the batch computer 250 or a computer residing in the message center 260 may run the animation of the concrete plant 205 and display the animation on the mobile device 275 or portable computer 80.

When the mobile device 275 receives the codes for the concrete plant 205, an animator may be started. The animator preferably illustrates components of the concrete plant 205 such as the concrete plant air pressure 295, the storage tank 210, the pump 215, the meter 220, the fill solenoid 290, the fill valve 225, the measure tank 230, the discharge solenoid 300, the discharge valve 235, and the overfill sensor 305, the high zero sensor 265, and the low zero sensor 310 for the measure tank 230. None of the components listed need to be included in the animator, and other components of the concrete plant 205 may be included in the animator.

At the start of the animation process, each component preferably has a box or series of boxes that displays the component's operational condition. For example, at the start of the animation depicted in FIG. 7, the concrete plant air pressure 295 has a value of 120.3 psi. As the animation proceeds, the operational condition for each component is updated and displayed. For example, as the animation illustrated in FIG. 7 proceeds, the concrete plant air pressure 295 will change from 120.3 psi to other values, and a technician can watch the values to determine whether the concrete plant air pressure 295 was within acceptable limits during the time period animated. Similarly, the values for the other components in the animation will change as the animation progresses through the time period. The changing values for each of the components are based on the codes recorded by the data recorder 255.

The animator enables rapid troubleshooting based on visual cues. For example, the animator may display liquid flows in color to permit easily tracking where a liquid is flowing and when. Each stage of the animation preferably displays the operational condition of each of the components at a particular time in a box next to each component. The changing values for each of the components, presented in a time-wise progression, preferably reduces or eliminates the need to manually sort through the codes and deduce what actions transpired at what times. The animator also preferably gives the operator a visual view that is the same as, or may be similar to, the view the operator would have if standing at the plant watching the equipment operate. By viewing the batch progression on a graphical screen the operator may notice operational conditions that may not have been reported in the codes. The animator may thus allow a technician to view the various batches without needing to understand the various codes or the operating conditions for the concrete plant 205.

In the example of the fill solenoid sticky valve, low air code being generated, but the concrete plant air pressure 295 and the fill solenoid valve 290 appearing to be operating normally, discussed above, the animator may reveal that the discharge solenoid valve 300 turned on too soon, resulting in low air pressure to the fill solenoid valve 290. With only the codes generated by the sensors the field box 240, or both, solving such a problem could be very time consuming. But, with the animated codes, solving such a problem could be more efficiently done.

In some embodiments the computer or mobile device 275 displays recommendations for how to fix errors after error messages have been played through the animator. For example, certain warning or error codes may be commonly associated with a problem that has one, or a few, solutions. When such a warning or error code is played back through the animator, the solutions to the commonly associated problem may be displayed by the computer or mobile device 275.

In other embodiments, the computer or mobile device 275 displays a question or command, or a series of questions or commands, that are based on the codes. For example, certain warning or error codes may relate to a specific component, such as a discharge valve 235, of the concrete plant 205. The animator on the computer or mobile device 275 preferably prompts a service repair technician to visually inspect the discharge valve 235, or to manually operate the discharge valve 235, for example to open or close the valve, or otherwise interact with the discharge valve 235. By presenting questions or commands based on the codes or warnings, the animator on the computer or mobile device 275 may assist a service repair technician diagnose or analyze why a failure, error, or malfunction occurred and how to correct such failure, error, or malfunction.

In other embodiments, field boxes 15A may be used to perform the above-described functions instead of field boxes 240. When field boxes 15A are used, a master controller 245 may not be needed.

Dispensing Equipment

When dispensing concrete ingredients into a vehicle, care must be taken to dispense the proper amount of concrete ingredients into the vehicle for the specified concrete recipe. An improperly loaded vehicle may compromise the concrete batch, for example, by imparting undesired consistencies or cure rates to the fluid concrete, or providing undesired finished properties such as hardness, air retention, or color, to the hardened concrete.

Figure 8:
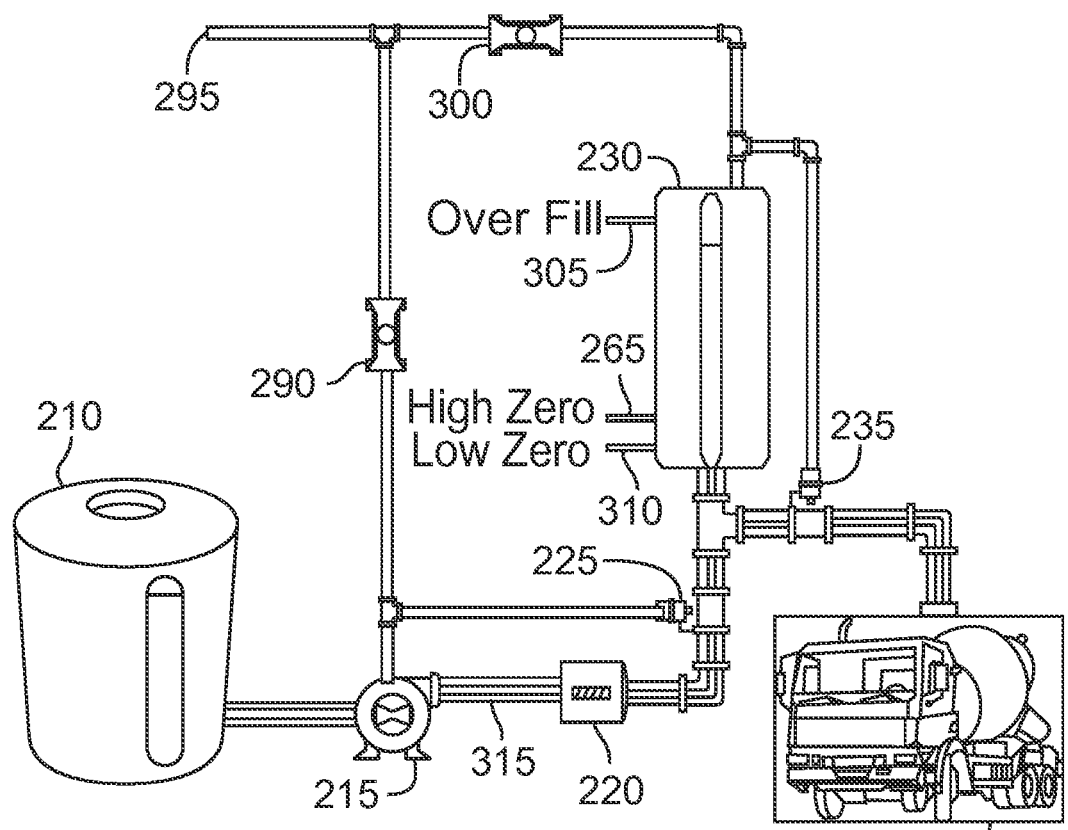
FIG. 8 is a schematic illustration of a control system for dispensing concrete ingredients.

Referring to FIG. 8, a dispensing system for dispensing admixture and a method for monitoring admixture discharge is described. Other embodiments may dispense or monitor other ingredients for a concrete batch, including, but not limited to, water, cement, aggregates, and fines. Admixture is deposited into the storage tank 210 before being dispensed into a vehicle 700. Redundant measuring systems are included to ensure that the vehicle 700 is not improperly loaded.

Current redundant systems include operating a meter 220 to measure the volume of admixture flowing through pipe 315 as a primary volume determination. In conventional dispensing systems, a redundant determination is made by flowing the admixture into a measure tank 230 equipped with an overfill sensor 305. However, whether the measure tank 230 prevents a vehicle 700 from being improperly loaded with admixture depends on the volume of the measure tank 230 and the location of the overfill sensor 305 approximating the volume of admixture or admixture component a particular concrete recipe calls for. Conventional dispensing systems may also use a second redundant determination by providing a transparent window on the measure tank 230 so an operator may visually determine the volume of admixture or admixture component in the measure tank 230. However, reading through a transparent window may not provide an accurate measurement, and may be conducted differently by different persons, resulting in inconsistent amounts of admixture dispensed.

Additional redundant systems for determining the volume of admixture or admixture component to be dispensed into a vehicle 700 may improve the accuracy of how much admixture is actually dispensed into a vehicle 700 or may reduce or eliminate some of the potential errors associated with previous redundant systems. For example, monitoring equipment parameters such as the operating time of a solenoid, such as fill solenoid 290 or discharge solenoid 300, when it is in the open position, the parameters of a pump 215, or other suitable parameters, may help determine the amount of admixture dispensed.

For example, the fill valve 225 is controlled by the fill solenoid 290, and the discharge valve 235 is controlled by the discharge solenoid 300. When a solenoid, such as fill solenoid 290 or discharge solenoid 300, operates it has an operating time. Field boxes 240 in certain embodiments measure the operating time of the fill solenoid 290 and the discharge solenoid 300 during calibration cycles. By running calibration cycles and measuring the volume, or amount, of admixture either dispensed into the measure tank 230, or dispensed from the measure tank 230, and simultaneously measuring the operating time of the fill solenoid 290, the discharge solenoid 300, or both, a baseline operating time for the fill solenoid 290, the discharge solenoid 300, or both, can be established for various volumes or amounts of admixture. The operating time of either the fill solenoid 290 or the discharge solenoid 300 may subsequently be used as a measurement of the amount of admixture dispensed by comparing the operating time to the known operating time values for various amounts of admixture. Either an over operating time or under operating time for the fill solenoid 290 or the discharge solenoid 300 may trigger an abnormal operation code that is transmitted to the field box 240, or generated by the field box 240. An expected operating time for the fill solenoid 290 or the discharge solenoid 300 may trigger a normal operation code that is transmitted to the field box 240, or generated by the field box 240.

In certain embodiments, the actual flow rate is used as an indication of whether the components of the concrete plant 205 are operating normally. The expected operating range for the flow rate may include a minimum, average, and maximum flow rate. In one embodiment, the meter pulse count is divided by the fill valve 225 open time to obtain an actual flow rate. The actual flow rate is preferably used as a simple indicator of whether the components used to discharge admixture are operating normally. For example, a weak, leaky, or fast running pump 215, a broken or leaking pipe 315, a faulty or plugged valve 225 or 235, or a plugged meter 220, or other malfunctioning component may decrease or increase the flow rate. The actual flow rate is therefore compared against the expected flow rate operating range by the field box 240 to serve as an indication of when the components need to be serviced. By comparing the actual flow rate against the expected flow rate operating range, a good indication of component health may be made. For example, if the actual flow rate is near the average the components may be properly working, and if the actual flow rate is near the minimum or maximum, or outside the range, one or more components may be malfunctioning and need to be serviced.

In other embodiments, the field box 240, or a field box 15A (FIG. 1A), literally controls each stroke of the pump 215 or monitors each stroke of the pump 215. For example, the field box 240 preferably monitors any one parameter, or a combination of parameters, such as how long the pump 215 operates, how may cycles the pump 215 goes through, the pump 215 outlet pressure, the average flow through the pump 215, or other operating parameters. As with measuring the operating time for the fill solenoid 290 and the discharge solenoid 300, calibration cycles are preferably made to correlate the values for operating parameters of the pump 215 with various volumes, or amounts, of admixture. In some embodiments, once the values for the operating parameters of the pump 215 have been correlated to specific volumes, or amounts, of admixture, the operating parameters of the pump 215 are monitored and used as a redundant method of determining the volume of admixture discharged into a vehicle measure tank 230 or vehicle 700.

In certain embodiments, an operating parameter, such as the operating time, for the fill solenoid 290 and the operating parameters for the pump 215 are monitored and used as the redundant and second redundant admixture amount measurements. The amount, or volume, measured by the meter 220 is preferably the primary admixture volume measurement. Such embodiments may reduce or eliminate the need to include the measure tank 230, discharge solenoid 300, or the discharge valve 235 while providing redundant and second redundant admixture volume measurements to ensure that vehicle 700 is properly loaded with admixture. Another advantage to monitoring and using the operating parameters for the fill solenoid 290 and the operating parameters for the pump 215 is that the redundant and second redundant admixture volume measurements are automated and do not rely on sensors in a tank 230 being placed to match a concrete recipe's required volume of admixture or on potential human error stemming from an operator estimating the volume of admixture in a tank 230.

The primary admixture volume measurement, such as a reading from flow meter 220, is preferably used to determine when a predetermined volume of admixture called for by a recipe has been delivered from a storage tank 210. In one embodiment where a batch panel, such as batch panel 20A (FIG. 1) controls operation of a pump and flow meter, such as pump 215 and flow meter 220, meter pulses from the flow meter 220 are received by a field box, such as field box 15, 15A, or 240 before being transmitted back to the batch panel. The field box 15A, for example, shapes the meter pulses before transmitting such meter pulses to the batch panel. Shaping the pulses, transforming them into a square wave for example, helps the batch panel recognize the meter pulses and make an accurate count of the meter pulses.

The present inventors have recognized that many existing batch panels are capable of receiving a maximum number of electrical pulses per second, such as 10 for example. Flow meters generate metering pulses in response to rotation of an internal propeller, which may rotate faster or slower depending on the flow rate of a fluid through the flow meter. Thus, it is possible for a flow meter to generate metering pulses at a rate that is faster than a batch panel can receive. For example, a flow meter may have fluid quickly flowing therethrough for one second and may generate 15 metering pulses per second in response. The fluid flow may then slow down for the next second and the flow meter may generate 5 metering pulses per second in response. If the flow meter sends such metering pulses directly to a batch panel that is capable of receiving up to 10 pulses per second, the batch panel is likely to miss, or not count, several of the metering pulses in the first second and to count all of the metering pulses sent during the second.

For the 2 second period the batch panel will not have counted 20 metering pulses (which represents the actual amount of fluid that flowed through the flow meter), but will have counted a lesser number and will therefore underestimate the amount of fluid that flowed during the 2 second period. Since each metering pulse corresponds to a fluid amount, a batch panel that is counting metering pulses to stop the fluid flow at a desired amount (for example, at 20 pulses) will end up stopping the fluid flow only after too much fluid has passed through the flow meter.

Therefore, in one embodiment the field box 15A may also adjust the rate at which meter pulses are sent back to the batch panel to further assist the batch panel with accurately counting the meter pulses. For example, the field box 15A may receive the metering pulses from the flow meter for the 2 second period described in the previous paragraph. The field box 15A may also be programmed to transmit metering pulses to the batch panel at a rate of 10 pulses per second. Therefore, the field box 15A transmits 10 metering pulses to the batch panel during the first second (even though there were actually 15 metering pulses) and also transmits 10 metering pulses to the batch panel during the second second (even though there were actually 5 metering pulses). The batch panel is thus able to accurately count all of the metering pulses and is able to shut off the fluid flow much closer to the desired fluid amount. In addition, the batch panel may be programmed to account for metering pulses that represent a "free fall" amount, that is an amount of fluid that flows after a stop or shut-off command has been transmitted from the batch panel to the pump. For example, a batch panel that is counting to 20 metering pulses to shut off the fluid flow may shut off the fluid flow when the count reaches 19 metering pulses because the time required to transmit the shut off signal is sufficiently long to permit another metering pulse to occur.

In another embodiment, a field box, such as field box 15, 15A, or 240, may transmit metering pulses to a batch panel at or below the maximum rate at which the batch panel can receive metering pulses. For example, for a batch panel that can receive a maximum of 10 metering pulses per second a flow meter may generate 15 metering pulses the first second, 11 metering pulses the second second, 6 metering pulses the third second, and 4 metering pulses the fourth second. A field box 15A, for example, receiving such metering pulses may transmit 10 metering pulses to the batch panel the first second, 10 metering pulses the second second, 10 metering pulses the third second, and 6 metering pulses the fourth second.

In another embodiment, a field box, such as field box 15, 15A, or 240, may transmit metering pulses on a one to one basis, or may aggregate metering pulses before transmitting metering pulses to a batch panel. When metering pulses are transmitted on a one to one basis, each metering pulse received by the batch panel correlates directly to an amount of fluid passing through a flow meter, 0.1 ounce for example. If a much larger amount of fluid is to be dispensed, instead of overloading the batch panel with numerous metering pulses, the field box may be programmed to aggregate metering pulses from the flow meter before sending a metering pulse to the batch panel. Thus, a metering pulse received by the batch panel indirectly correlates to an amount of fluid passing through the flow meter. For example, a metering pulse received by the batch panel may equal 10 metering pulses and thus represent 1.0 ounce instead of 0.1 ounce. Thus a flow meter may be operated with a fluid flowing therethrough at a very high rate of speed and an existing batch panel may still receive 10 pulses per second from a field box, for example, without needing to modify the batch panel to receive metering pulses at a higher rate.

When the primary volume measurement reaches the predetermined volume, the redundant admixture volume measurement, second redundant admixture volume measurement, or both, are compared to the primary volume measurement to determine whether the predetermined volume of admixture was delivered. In a preferred embodiment, admixture is stopped from flowing from a storage tank 210 when the primary volume measurement reaches the predetermined volume called for by a recipe and the redundant admixture volume measurement, second redundant volume measurement, or both, approximates the predetermined volume measurement. That is, the redundant and second redundant volume measurements do not need to precisely match the primary volume measurement. In one example, the redundant and second redundant volume measurements are preferably within a given range of the primary volume measurement, for example, plus or minus 3%. If there is a difference greater than plus or minus 3% between the primary volume measurement and the redundant or the second redundant volume measurement an error code is preferably generated by the field box 240.

Figure 13:
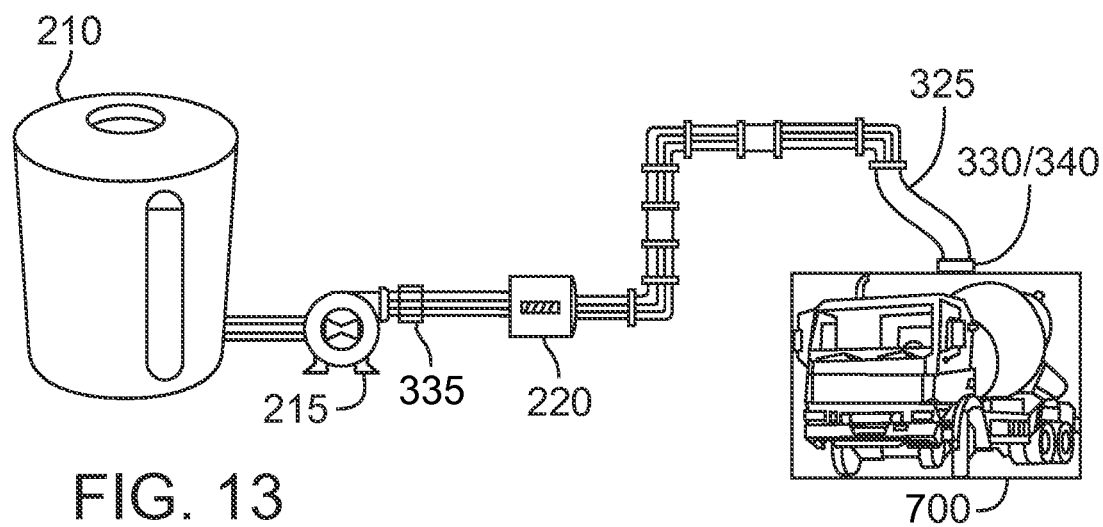
FIG. 13 is a schematic illustration of another control system for dispensing concrete ingredients.

With reference to FIG. 13, in addition to measuring the amount of admixture delivered from a storage tank 210, the present inventors realized it is helpful to determine whether the measured admixture is actually deposited into a delivery truck 700, or whether admixture is being spilled on the ground creating incomplete admixture recipes and possibly environmental concerns. For example, a delivery hose 325 may come loose, develop a leak, or another leak from the pump 215 to the truck 700 may Occur.

An exemplary flow loss determining device preferably uses two means for measuring flow, for example, a constant-temperature hot-wire anemometer 330 and a pressure sensor 335, both communicating with a field box 240 over the electronic interface 285. The hot-wire anemometer 330 is preferably powered by an adjustable current to maintain a constant temperature. By adjusting current to maintain a constant temperature for the wire in the hot-wire anemometer 330, a detected change in the needed current corresponds to a change in fluid velocity flowing past the wire because fluidic cooling of the wire is a function of flow speed (assuming the fluid temperature remains constant) and assuming that the wire, heated by an electrical current input, is in thermal equilibrium with its environment in the hose 325. The electrical power input therefore corresponds to the power lost to convective heat transfer and a change in power needed to maintain the wire's temperature corresponds to a change in fluid velocity. If a leak or break in the hose 325 is located away from the meter 220 and pump 215, but before the discharge end of the hose 325 proximate the truck 700, the hot-wire anemometer 330 will not detect a loss in fluid flow unless it is mounted proximate the discharge end of the hose 325.

The pressure sensor 335 located proximate the pump 215 preferably detects both a dynamic pressure created by each pump stroke and a static pressure that the admixture creates in the hose 325. With the pressure sensor 335 mounted proximate the meter 220 and the pump 215, when the pump 215 is not operating and the admixture in the hose 325 is at a stand still, if a drop in the static pressure is detected by the pressure sensor 335 then the hose is leaking some where. Alternately, a second pressure sensor 340 may be mounted proximate the discharge end of the hose 325 in place of a hot-wire anemometer 330, and may be used to measure dynamic pressure in the hose 325. The field box 240 may compares the dynamic pressure measured by the pressure sensor 335 against the dynamic pressure measured by the pressure sensor 340 to determine whether the measured dynamic pressures match (taking into account the pressure loss due to the length of the hose between the pressure sensors 335 and 340), indicating no leaks in the hose 325, or whether the dynamic pressure measured by the second pressure sensor 340 is lower than the dynamic pressure measured by the first pressure sensor 335, indicating a leak in the hose 325.

In other embodiments, field boxes 15A may be used to perform the above-described functions instead of field boxes 240. When field boxes 15A are used, a master controller 245 may not be needed.

Equipment Maintenance

Regardless of whether components are monitored by a field box 240 or are controlled by a field box 240, the operating parameters for components are preferably used to predict when maintenance or other servicing may be needed. For example, a field box 240 preferably tracks and records a history of one or more operational parameters for a component. The history preferably includes the number of times the component has been operated, the duration of each operation, the number of cycles for each operation, the average, high pressure, low pressure, or both, for each operation, or other suitable operational parameters. The history may also associate each recorded operational parameter with a particular number from the number of times the component has been operated so there is a sequential order for each of the recorded operational parameters.

In addition to events generated by a piece of equipment, a field box 240 may also record or otherwise capture external events. When a technician services a piece of equipment, the technician may clock in with the field box 240 associated with such equipment. For example, a field box 240 may be associated with a single piece of equipment and the technician may simply touch an electronic key, such as a card with an induction coil, to the field box 240 to indicate that a service call was made for the piece of equipment. Or, a field box 240 may be associated with two or more pieces of equipment. The technician may also use an electronic key to indicate that a service call was made and may enter a code or description to indicate which piece of equipment was serviced. By recording when a technician services which piece of equipment, individual service calls can be associated with individual pieces of equipment, for example, to assist making future maintenance predictions or for troubleshooting.

Predictions for when a component is likely to need servicing or repair preferably account for cumulative values for one or more of the operating parameters that make up the recorded history, comparison of individual or cumulative operating parameters against expected total or final values for the operating parameters, or analysis of the history for one or more operating parameters including, but not limited to, trends, statistics, and interactions among different operational parameters. Expected total or final values for the operating parameters may be preprogrammed into field boxes 240, or the field boxes 240 may learn to recognize such expected total or final values for the operating parameters without preprogramming, as described below.

Similarly, the history for one or more operating parameters may be used to predict what parts of a component may need servicing or repair.

In other embodiments, the field boxes 240 learn the normal operation of the concrete plant 205 when admixture is discharged into the vehicle 700 without preprogramming the field boxes 240, or without conducting calibration cycles. Having the field boxes 240 learn the normal operations of the concrete plant 205 preferably enables customized installations of the field boxes 240 without preprogramming the field boxes 240 with information specific to the concrete plant 205, or the equipment in the concrete plant 205.

Figure 9:
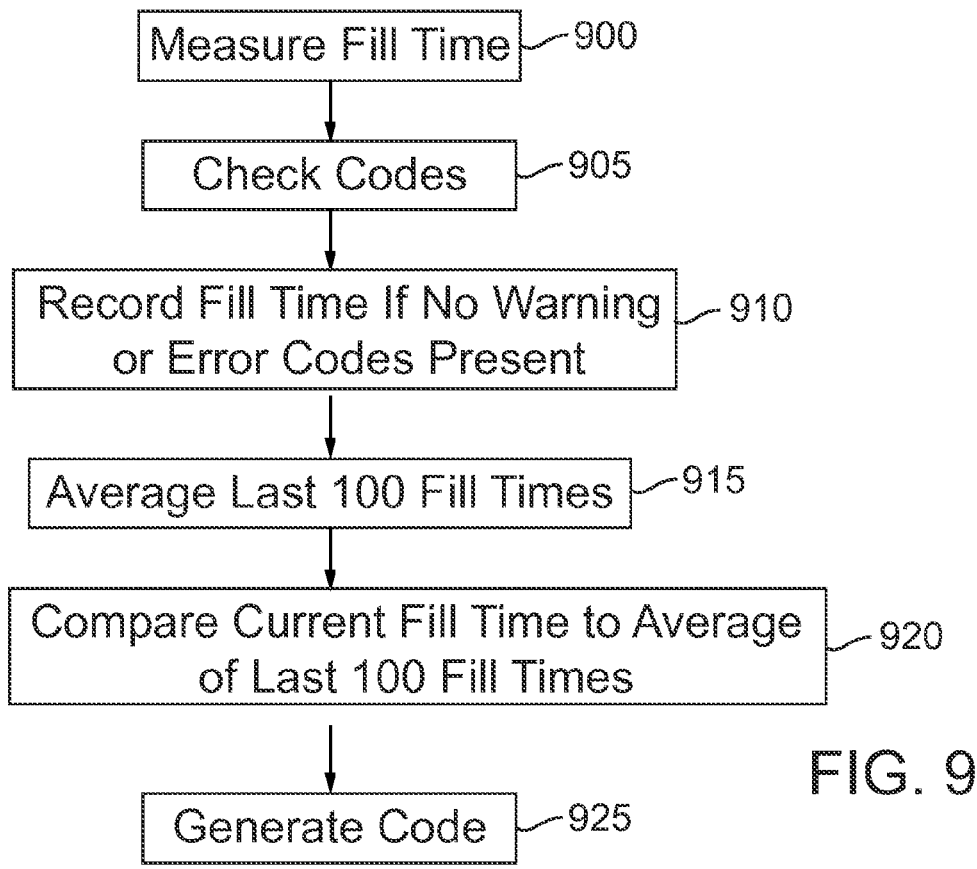
FIG. 9 is a flow chart for a method of a field box learning operational parameters of a concrete plant.

An exemplary embodiment of the field box 240 learning a normal operation of the concrete plant 205 is described with reference to FIGS. 3 and 9. The following discussion assumes that the learning occurs for a predetermined amount of admixture to be dispensed, and that similar learning occurs for different amounts of dispensed admixture. At step 900 the field box 240 measures the fill time that the fill valve 225 is open. The field box 240 compares the measured fill time the fill valve 225 is open against any codes generated, by the fill valve 225 or by any other component communicating with the field box 240, while admixture is dispensed into the vehicle 700 at step 905. By comparing the fill time for the fill valve 225 against any generated codes, the field box 240 may determine whether the measured fill time is associated with a normal operation code or with a warning or error code. At step 910 the field box 240 records the time the fill valve 225 was open as a normal fill time if no warning or error codes were present. Otherwise, the field box 240 does not record the time the fill valve 225 was open if there was a warning or error code generated.

The field box 240 preferably averages the last 100 normal fill times at step 915. In alternative embodiments, the field box 240 creates a range by tracking the lowest normal fill time and the highest normal fill time for the last 100 fill times. Other methods may be used for creating or updating a history for an operational parameter. At step 920 the field box 240 compares the current fill time to the average normal fill time for the last 100 normal fill times. In alternative embodiments, the field box 240 compares the current fill time to the range of normal fill times for the last 100 normal fill times. Other embodiments may use other methods for comparing a current operational parameter against the operational parameter's history.

If the current operational parameter deviates from the operational parameter's history by more than an acceptable amount, the field box 240 preferably generates a warning or error code or message. For example, if the current fill time deviates from the average of the last 100 normal fill times by more than a preset time or percentage, for example 3%, then the field box 240 generates an error code at step 925. In alternative embodiments, if the current fill time falls outside the range established by the lowest normal fill time and the highest normal fill time from the last 100 normal fill times then the deviation is by more than an acceptable amount and the field box 240 preferably generates an error code at step 925. Otherwise, the field box 240 preferably generates a normal code. Other embodiments may use other factors to evaluate whether the current operational parameter deviates from the operational parameter's history by more than an acceptable amount and a warning, alarm, or normal code should be generated based on the comparison against the operational parameter's history.

The field box 240 learning the normal fill time for the fill valve 225 is only an example of an operating parameter of the concrete plant 205 that may be learned and used to generate warnings or errors. The field box 240 may learn other normal operating parameters such as, but not limited to, the operating time of a solenoid, such as fill solenoid 290 or discharge solenoid 300, the outlet pressure of the pump 215, the number of cycles the pump 215 goes through, or the plant air pressure 295. In some embodiments, the field box 240 learns normal operating parameters for select admixture amounts, and may interpolate a normal operating parameter for an admixture amount falling between two select admixture amounts.

In other embodiments, field boxes 15A may be used to perform the above-described functions instead of field boxes 240. When field boxes 15A are used, a master controller 245 may not be needed.

Determining Admixture Usage

Current concrete plants that dispense admixture commonly report the amount of admixture in each tank once a day, typically late at night or early in the morning. Because current invoices for admixture deliveries require approximately a week to process, the present inventors have recognized that an admixture supply company does not have information regarding how much admixture is delivered to a tank to accompany the daily admixture amount report. Therefore, the daily "snapshot" providing the amount of admixture in a tank does not provide an admixture supply company information regarding how much admixture a concrete plant is using because the admixture supply company does not know how much admixture was added to a tank until well after the addition was made. Not knowing the admixture usage rate makes scheduling admixture deliveries imprecise, and potentially leads to delivering too little admixture, or sending a truck with too much admixture. Moreover, without knowing usage rates and being able to determine how may days remain until a tank at a particular concrete plant is empty, diverting a truck with too much admixture to a concrete plant that needs the admixture is difficult to determine, often resulting in overloaded trucks dispensing excess admixture at a concrete plant that does not require the admixture as badly as another concrete plant does.

Figure 10:
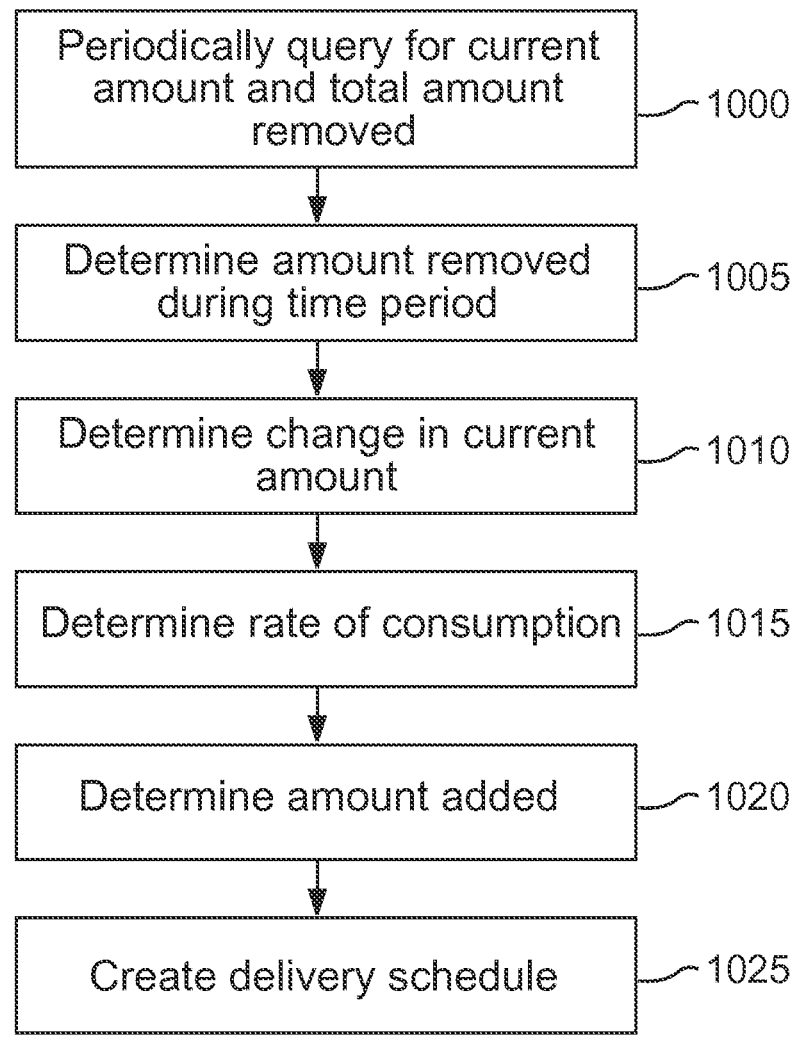
FIG. 10 is a flow chart for a method of a batch computer scheduling material delivery.

Referring to FIGS. 2 and 10, an exemplary method for determining the amount of admixture in each storage tank 30 and the rate of usage from each storage tank 30 is illustrated. Level sensors 45 in storage tanks 30 monitor the total amount of admixture in each storage tank 30 by providing signals, or codes, associated with the amount of admixture in each storage tank 30 and transmitting the signals, or codes, to the data recorder 255. In one embodiment level sensors 45 are pressure sensors mounted at the bottom of storage tanks 30 and detect the pressure exerted by the admixture in the tank. Level sensors 45 transmit a signal corresponding to the pressure exerted by the admixture in each storage tank 30 to the data recorder 255, preferably when the data recorder 255 queries the level sensors 45. However, level sensors 45 may be used to determine when admixture in the storage tanks 30 is being agitated, for example, by detecting rapid, minute changes due to admixture flowing out of a storage tank 30 or additional admixture being added to a storage tank 30. When a determination is made that the admixture is being agitated, the level sensors 45 preferably do not transmit a signal and instead wait until the admixture is not being agitated before transmitting a signal corresponding to the pressure exerted by the admixture.

Data recorder 255 is preferably a modified data recorder with modifications to include a programmable logic device, such as a microprocessor, firmware, or other suitable components to provide intelligence and decision capabilities for the data recorder 255. The data recorder 255 communicates with the electronic interface 50, and preferably transmits the signals gathered from the level sensors 45 to the message center 260 through the electronic interface 50, the master controller 25, and the second electronic interface 60. The data recorder 255 preferably calculates the amount of admixture in each storage tank 30 based on the geometric shape of each storage tank 30 and the specific gravity of each admixture in each storage tank 30, or on other suitable variables.

In the exemplary embodiment, flow meters 40 monitor the total amount of admixture removed from each storage tank 30 by keeping a running tally of the amount of admixture that has passed through each flow meter 40. The modified data recorder 255 also queries the flow meters 40. In response, each flow meter 40 sends a signal or code to the data recorder 255 associated with the total amount of admixture that has passed through each flow meter 40. The data recorder 255 associates the signals from the flow meters 40 with the total amount of admixture removed from each storage tank 30, and transmits the information to the message center 260.

At step 1000, the data recorder 255 preferably queries the level sensors 45 and the flow meters 40 at the same time, and on a periodic basis. For example, the modified data recorder 255 preferably makes such queries once every five minutes. The time period of the periodic basis may be longer or shorter. The information gathered from the level sensors 45 and the flow meters 40 is transmitted to the message center 260 and the message center 260 calculates the amount of admixture in each storage tank 30 based on the signals or codes originating from the level sensors 45, for example, as described above. Alternately, the data recorder 255 calculates the amount of admixture in each storage tank 30 based on the signals or codes originating from the level sensors 45. The message center 260, data recorder 255, or both, also records the amount of admixture that has flowed through each flow meter 40 based on the signals or codes originating from the flow meters 40.

At step 1005, the data recorder 255 or the message center 260 determines the amount of admixture removed from each tank 30 during the time period. For example, for each tank 30, the data recorder 255 or the message center 260 subtracts the previous total amount of admixture that had flowed through each flow meter 40 from the current amount of admixture that flowed through each flow meter 40.

At step 1010, the data recorder 255 or the message center 260 determines a change in the amount of admixture in each storage tank 30. For example, the data recorder 255 or the message center 260 subtracts the previous amount of admixture in each storage tank 30 from the current amount of admixture in each storage tank 30. A negative number indicates a decrease in the amount of admixture in a storage tank 30, while a positive number indicates an increase in the amount of admixture in a storage tank 30.

At step 1015, the data recorder 255 or the message center 260 determines a rate of consumption for each admixture from each storage tank 30. For example, the data recorder 255 or the message center 260 preferably calculates the rate of consumption by dividing the amount of admixture removed by the time period.

At step 1020, the data recorder 255 or the message center 260 determines how much admixture was added to each storage tank 30. For example, the data recorder 255 or the message center 260 preferably determines the amount of admixture added to a storage tank 30 by adding the change in the total amount of admixture determined at step 1010 to the amount of admixture removed from the tank 30 determined at step 1005.

At step 1025, the data recorder 255 or the message center 260 creates a delivery schedule for delivering admixtures to the tanks 30, preferably based on the amount of material in each tank 30, the rate of consumption determined at step 1015 for each tank 30, and the amount of material added to each tank 30 determined at step 1020.

For example, consider two separate concrete plants 10, each with a storage tank 30 with a 100 gallon capacity and storing an air-entraining admixture. At the end of four time periods, the fourth time period representing the end of the day, the data recorder 255 gathers information from the flow meter 40 and level sensor 45 for the first and second tanks 30 and transmits the information to the batch computer 55. At step 1000, the data recorder 255 or the message center 260 calculates the following values (in gallons) for the end of each time period, each of which is 2 hours.

|  | First period | Second period | Third period | Fourth period |
| --- | --- | --- | --- | --- |
| First flow meter 40 | 200 | 201 | 202 | 203 |
| First level sensor 45 | 22 | 21 | 20 | 30 |

-continued

|  | First period | Second period | Third period | Fourth period |
|---|---|---|---|---|
| Second flow meter 40 | 800 | 815 | 835 | 850 |
| Second level sensor 45 | 75 | 60 | 45 | 30 |

For the first tank 30, associated with the first flow meter 40 and the first level sensor 45, at step 1005 the data recorder 255 or the message center 260 determines the amount of admixture removed from the first tank 30 during the second, third, and fourth time periods to be 1 gallon, 1 gallon, and 1 gallon. For the second tank 30, associated with the second flow meter 40 and the second level sensor 45, at step 1005 the data recorder 255 or the message center 260 determines the amount of admixture removed from the second tank 30 during the second, third, and fourth time periods to be 15 gallons, 20 gallons, and 15 gallons.

At step 1010, the data recorder 255 or the message center 260 determines the change in the amount of admixture in the first storage tank 30 during the second, third, and fourth time periods to be −1 gallon, −1 gallon, and +10 gallons. At step 1010 the data recorder 255 or the message center 260 determines the change in the amount of admixture in the second storage tank 30 during the second, third, and fourth time periods to be −15 gallons, −15 gallons, and −15 gallons.

At step 1015, the data recorder 255 or the message center 260 determines the rate of consumption for the admixture from the first storage tank 30 during the second, third, and fourth time periods to be ½ gallon per hour, ½ gallon per hour, and ½ gallon per hour. At step 1015, the data recorder 255 or the message center 260 determines the rate of consumption for the admixture from the second storage tank 30 during the second, third, and fourth time periods to be 7.5 gallons per hour, 10 gallons per hour, and 7.5 gallons per hour.

At step 1020, the data recorder 255 or the message center 260 determines how much admixture was added to the first storage tank 30 during the second, third, and fourth time periods to be 0 gallon, 0 gallon, and 11 gallons. At step 1020, the data recorder 255 or the message center 260 determines how much admixture was added to the second storage tank 30 during the second, third, and fourth time periods to be 0 gallon, 5 gallons, and 0 gallon.

The data recorder 255 or the message center 260 then creates a delivery schedule for the first and second concrete plants 10 based on the rate of consumption from each of the first and second storage tanks 30 determined at step 1015 and on the amount of admixture added to each of the first and second storage tanks 30 at step 1020. For example, the delivery schedule can be created at the end of each time period. Alternately, the delivery schedule can be created at the end of the last time period. In either situation, the delivery schedule may be based on only the most recently ended time period, on all of the time periods, or on a select number of the time periods. An exemplary delivery schedule may be to deliver 80 gallons of admixture 2 hours into the working day to the first concrete plant 10 and to deliver 70 gallons of admixture to the second concrete plant after the delivery to the first concrete plant is made. Knowing the rates of usage and whether admixture was delivered for a day thus preferably helps create timely delivery of needed amounts of admixture without unnecessary driving or delays.

In contrast, information used to create a current delivery schedule is commonly limited to the information that the first and second tanks each have 30 gallons of admixture. A delivery schedule may be made to deliver admixture to the first tank first, then the second tank. Depending on the time of the deliveries, the second tank runs the risk of running out of admixture before the delivery is made.

In other embodiments, field boxes 15A may be used to perform the above-described functions instead of field boxes 240. When field boxes 15A are used, a master controller 245 may not be needed.

Inventory

Inventory tracking for components and concrete ingredients may be made more efficient and accurate through the use of RFID tags. RFID tags are preferably attached to components, and replacement components, for the concrete plant 205. Because RFID tags can be read from up to 5 meters away from the tag and do not require a line-of-sight between the RFID tag and a data reader 320 (FIG. 3), a worker at the concrete plant 205 may quickly tour the concrete plant 205 with data reader 320 and pick up signals from the RFID tags. The RIFD tags may be passive, that is, require a radio frequency transmission to activate and power the RFID tag, or they may be active, that is, have a power source, either portable or wired to a power grid. In either case, the RFID tags transmit a unique code to the data reader 320. The data reader 320 preferably stores the unique codes on a memory, for example, a flash memory, and downloads the unique codes to a system, for example, the master controller 245, or field boxes 240 using the electronic interface 285, such as a CAN-bus.

The unique codes are preferably used to identify a type of component. For example, a unique code is the code for a pump 215, and all of the pumps 215 are associated with the same unique code. When the data reader 320 picks up a RFID signal with the unique code for a pump 215, the data reader 320 preferably increments a counter for that particular component to indicate the number of pumps 215 at the concrete plant 205. The data reader 320 may also be connected to a global positioning system (GPS) that records the approximate coordinates for each component, making the components easier to locate.

The unique codes may also be used to identify individual components. When the unique codes identify individual components, each component has one unique code associated with it. For example, the data recorder 255 communicates with the message center 260 over a communication system 270. The message center 260 contains a database with the unique codes and a matching record for the specific component associated with each unique code.

After the collected unique codes are received by the field box 240 from the data reader 320, a computer in the message center 260 looks up in the database what components, either the number of a specific type of component, or individual components, are located at the concrete plant 205. Identifying types of components or individual components preferably provides tracking for such components or may be used to reset service records when components, for example, but not limited to, pumps 215, valves 225/235, and tanks 210/230, are moved or replaced.

In other embodiments, field boxes 15A may be used to perform the above-described functions instead of field boxes 240. When field boxes 15A are used, a master controller 245 may not be needed.

Field Boxes

Figure 11:
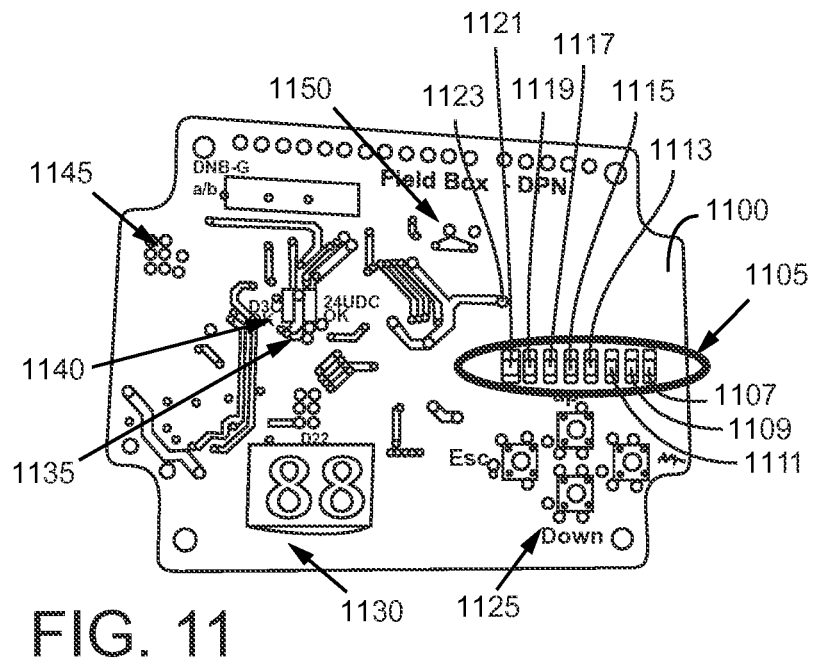
FIG. 11 is an exemplary embodiment of a printed circuit board for a field box.
Figure 12:
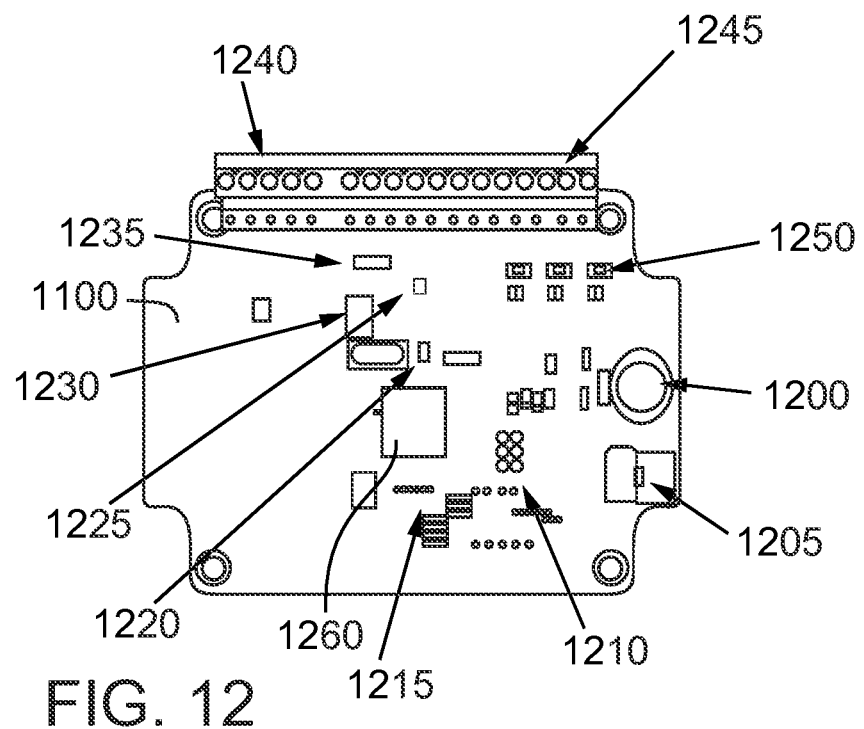
FIG. 12 is the opposite side of the exemplary embodiment of the printed circuit board of FIG. 11.

Referring to FIGS. 11 and 12, an exemplary embodiment of a printed circuit board in a field box, such as a field box 240, is described. A field box 240 preferably includes a printed circuit board contained in a housing, or may have several printed circuit boards contained in a housing. In alternate embodiments, a field box 240 may be a printed circuit board that is integral with a concrete plant component. One embodiment of a field box 240 is described referring to FIGS. 10 and 11, but field boxes 240 may have fewer or more components, and may contain software, hardware, or firmware for performing functions different from those described with respect to FIGS. 10 and 11. Field boxes 240 are not limited to having printed circuit boards.

A printed circuit board 1100 preferably has a plurality of light emitting diodes (LED) 1105 for indicating the status of various concrete plant components communicating with the field box 240. For example, nine LEDs 1105 may be used. In the illustrated embodiment, a green LED 1107 indicates when a filling operation occurs, for example, filling a measure tank 230. A second green LED 1109 indicates when a discharge operation occurs, for example, discharging an admixture from a measure tank 230 or from a storage tank 210 into a vehicle 700. A first yellow LED 1115 indicates when a low zero sensor 310 detects liquid in a measure tank 230, and a second yellow LED 1111 indicates when a high zero sensor 265 detects liquid in measure tank 230. A third yellow LED 1113 indicates when an overfill sensor 305 in measure tank 230 detects liquid. A red LED 1123 indicates when communication from both the wired and wireless communication systems is lost. A blue LED 1119 indicates there is a connection with the wireless communication device and preferably pulses when data is received or sent using the wireless communication device. A third green LED 1121 indicates a connection with the wired communication device and preferably pulses when data is received or sent using the wireless communication device. A fourth green LED 1117 preferably pulses when meter signals are received by the field box 240. Other indicators may be used to indicate the status of various concrete plant components communicating with the field box 240, including, but not limited to, different LEDs or lights, a display device, and mechanically altered switches. Other field box embodiments may not include indicators for indicating the status of various concrete plant components communicating with the field box 240.

Field box 240 preferably has an input 1125 for receiving programming signals, signals instructing the field box 240 to change modes or display information, or other signals or inputs. For example, the input 1125 may be a keypad connected to the printed circuit board 1100. The keypad may contain any number of keys. For example, in FIG. 11 the keypad has four keys, two for selecting various functions or modes, one for resetting selections without committing them to the processor 1260 (FIG. 12), and one key for committing selections to the processor 1260. Other key arrangements may be used. In alternate embodiments, the input 1125 may be a touch pad, trackball, infrared light receiver, or other device.

The input 1125 preferably operates in conjunction with a display 1130. In a preferred embodiment, display 1130 visually represents the programming selections, mode selections, or other selections made using the input 1125, and visually represents whether the selections were committed to the processor 1260 or not. Display 1130 may also visually represent other information such as error or operational codes, warnings, or other concrete plant 205 conditions.

In the embodiment illustrated in FIGS. 11 and 12, the field box 240 receives a direct current from an external power supply or from an internal power supply such as a battery. The received current may be 24 volts, or other suitable voltage. Alternatively, the field box 240 may receive an alternating current, and may convert the alternating current into a direct current. In the illustrated embodiment, the 24 VDC indicator 1135 is an LED that lights when the 24 VDC input 1205 receives an input voltage, for example a 24 volt direct current. The 24 VDC input 1205 is electrically connected to a 3.3 volt power supply 1200 for stepping the voltage down from 24 volts to 3.3 volts. A 3.3 VDC indicator, such as an LED, indicates that the 3.3 volt power supply 1200 is functioning. Stepping the voltage down preferably permits the field box 240 to continue operating normally when less than 24 volts is received at the 24 VDC input 1205, for example, from a brown-out or a low battery.

Stepping the voltage down from 24 volts to 3.3 volts also preferably permits the field box 240 to better receive signals from the low zero sensor 310, the high zero sensor 265, and the overfill sensor 305. For example, the concrete plant 205 may have an ambient voltage of approximately 50 volts of alternating current conducting along conductive materials such as pipes and wires. Such an ambient voltage may result from the power supplied to large pumps and other equipment in the concrete plant 205. The wires or cables connecting the field box 240 to the measure tank 230 may pick up this ambient voltage, thus making it difficult to detect higher voltage electrical signals sent from the low zero sensor 310, the high zero sensor 265, and the overfill sensor 305 to the field box 240.

In the embodiment illustrated in FIGS. 11 and 12, the field box 240 preferably sends a 3.3 volt direct current, square wave signal at 112.5 Hz to the low zero sensor 310, the high zero sensor 265, and the overfill sensor 305. Other voltages, signal shapes and frequencies may be used, preferably to differentiate the signal from the ambient voltage. The low zero sensor 310, the high zero sensor 265, and the overfill sensor 305 preferably communicate with the field box 240 over a closed electrical circuit that sends the 3.3 volt direct current, square wave signal at 112.5 Hz back to the field box 240 when the low zero sensor 310, the high zero sensor 265, and the overfill sensor 305 contact air.

When an electrically conducting liquid, for example an admixture, enters the measure tank 230 the liquid potentially reaches the positions of the low zero sensor 310, the high zero sensor 265, and the overfill sensor 305. When the low zero sensor 310, the high zero sensor 265, or the overfill sensor 305 encounter the electrically conducting liquid, the 3.3 volt direct current, square wave signal at 112.5 Hz is preferably conducted to ground instead of returning to the field box 240. By monitoring for the returning 3.3 volt direct current, square wave signal at 112.5 Hz, the processor 1260 in the field box 240 can determine whether the low zero sensor 310, the high zero sensor 265, or the overfill sensor 305 are contacting liquid or not.

Additionally, the processor 1260 preferably intermittently searches for the 3.3 volt direct current, square wave signal at 112.5 Hz so the search intervals coincide with the high and low pulses of the square wave. Searching for the high and low pulses of the square wave may reduce the likelihood that the processor 1260 will confuse the ambient voltage for a weak portion of the 3.3 volt direct current, square wave signal at 112.5 Hz.

The embodiment of a field box 240 illustrated in FIGS. 11 and 12 also contains an upgrade port 1210 to permit additional hardware to be connected or firmware loaded to the field box 240. A testing port 1215 is preferably included to permit testing the field box 240 before it is deployed in a concrete plant 205. A crystal clock 1220 preferably provides a wide operating temperature where the clock 1220 will operate, and also provide accurate timing with little drift.

Solenoid noise suppressors 1225, for example, a flyback diode, snubber diode, or freewheeling diode, or other suitable suppressor diode or device, are preferably included in the field box 240 to reduce the likelihood that harmonics and electromagnetic frequencies generated by solenoids interfere with other components of the field box 240. Solenoid overload protectors 1230, for example, a Raychem Poly-Switch model manufactured by Tyco Electronics Corp. of Berwyn, Pa., fuse, or other suitable device for protecting against overcurrent surges and over-temperature faults, is also preferably included to prevent the field box 240 from overloading and possibly damaging a solenoid. Solid state switches 1235 are preferably used because of their high reliability, however, other switches may be used as well. A five pin connector 1240 for connecting to the electronic interface 285, such as a CAN-bus, is configured to permit a connector, such as a CAN-bus connector, to be readily plugged in or unplugged. Likewise, a 12 pin connector 1245 preferably permits the field box 240 to readily connect to and from existing legacy systems typically used in concrete plants 205. The field box 240 preferably contains probe inputs 1250 for connecting to the low zero sensor 310, the high zero sensor 265, and the overfill sensor 305.

While an exemplary embodiment of a printed circuit board 1100 for a field box 240 was described, the present disclosure encompasses many modifications and variations for a field box 240, and is not meant to be limited to the single embodiment illustrated in FIGS. 11 and 12.

As discussed above with reference to FIG. 1A, other exemplary field boxes may include some or all of the communications functionality, translations functionality, or both, of a master controller. For example, with reference to FIG. 15, an exemplary field box 2000 includes a number of devices operatively connected together via a printed circuit board, such as a micro controller 2005 and optoisolators 2010 for protecting the microcontroller 2005 from high voltages that exist at typical concrete plants. Relays 2015 and LED indicators provide visual feedback regarding functions of the field box 2000 or of processes controlled by the field box 2000. For example, when lit a yellow LED 2020 indicates a timed discharge-delayed empty condition, a blue LED 2021 indicates zero-empty condition, and a red LED 2022 indicates a bottle overfill condition. Additional status LEDs may be included, such as an orange LED 2023 and a green LED 2024 and may be controlled by the microcontroller 2005 to indicate other desired functions, operations, successful status, or error status of the field box 2000.

Figure 16:
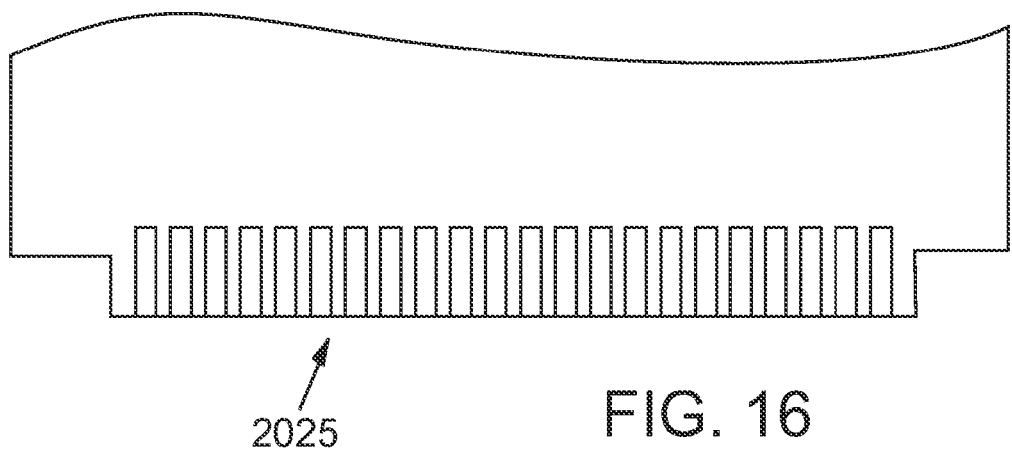
FIG. 16 is a bottom-side view of an exemplary embodiment of an edge connector for the field box of FIG. 15.

With reference to FIG. 16, the field box 2000 preferably includes a 22 contact card edge connector 2025 that mates to a single row connector found in a typical dual probe amplifier. For example, the edge connector 2025 may permit the field box 2000 to fit into a dual probe amplifier which preferably serves as an interface between the batch panel and the dispensing equipment and includes 8 or 6 card slots on a motherboard. An old card may be replaced with a field box 2000 to update an existing dual probe amplifier with new capabilities which may include reporting capabilities to achieve knowledge of various problems that occur with the dispensing equipment, making alerts to stop a bad batch from going out of a concrete plant, making reports used to verify claims against faulty admixture formation, dispensing, or amount, or other suitable capabilities useful in concrete plants.

Exemplary connections for some of the pins include connecting to power from a 24 VAC power source via edge connector pins 12 and 22, monitoring and reporting signals from a batch panel via edge connector pin 9 (bottle fill) and edge connector pin 2 (bottle discharge), and monitoring and reporting signals from equipment via edge connector pin 6, for example, monitoring and reporting fill signals that are sent to a batch panel as well as fill signals sent from a relay to a fill valve solenoid (thus monitoring fill input signals going in to and out from the field box 2000). Other exemplary signals monitored via edge connector pins may include, bottle overfill signals via edge connector pin 3, and zero level signals from an admixture bottle via edge connector pin 19. Similar to embodiments previously described, the field box 2000 preferably includes power regulation devices to inhibit fluctuations in the 24 VAC voltage from adversely affecting the field box 2000. Preferably, the field box 2000 is constructed to receive 24V DC or 120V AC signals from a batch panel, and includes brown out and power on reset circuitry for reliable operation.

Figure 17:
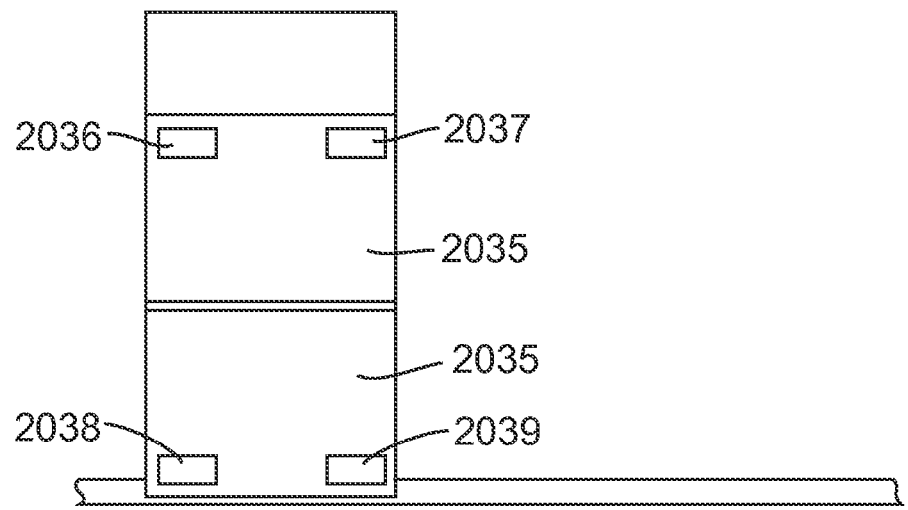
FIG. 17 is a review view of an exemplary embodiment of communication devices for the field box of FIG. 15.

The example field box 2000 also includes a 4 pin Molex connector 2030 to connect signals that are not connected via the 22 contacts card edge connector 2025 to the microprocessor 2005, such as meter pulses and power. Two 8 position RJ45 type connectors 2035 (best viewed in FIG. 17) are provided for interconnecting between the field box 2000 and a remote, processor, computer, or display. Each RJ45 type connector 2035 preferably includes two status LEDs 2036 and 2037 which may be used to indicate various information or status, such as error code indications, whether a communication or signal is going through a connector 2035, or other suitable indication or information.

The example field box 2000 also includes a programming port 2040 for updating the microprocessor 2005 and a debugging port 2045 for accessing the microprocessor 2005 for debugging or troubleshooting. A delayed empty potentiometer 2050 mounted on the front of the PCB provides setting a delayed time before showing a bottle empty signal to the batch panel (for example, a signal from a zero probe in the bottle), which preferably provides time to blow the line clean. A dip switch selector 2055 mounted on the front of the PCB preferably permits selecting the address of the field box 2000. Selecting an address for the field box 2000 allows the field box 2000 to label data originating from the field box 2000 with the appropriate bottle or dispenser for the batch panel. The dip switch selector 2055 also allows a user to disable the delayed time feature so that a bottle empty signal is sent to the batch panel concurrently when a bottle empty signal is generated. Alternatively a jumper on the PCB may be used to disable the delayed time feature. A connector 2060 for a flow transponder is also provided for the example field box 2000 to monitor a line full condition (for example, of the line between the admixture supply and the bottle). A failure to keep the line full can cause a batch stoppage, alarm, or both by the microprocessor 2005, for example, by tripping an overfill relay. The flow transponder connector 2060 may include a 4-pin 3.81" Phoenix socket (not illustrated, for example, mounted below an un-pluggable screw terminal which is illustrated as 2060). Preferably, the connector 2060 for the flow transponder also includes an input for a temperature sensor.

Preferably, the field box 2000 monitors for metering signals such as meter too fast, meter too slow and no meter pulse after passage of a predetermined or user input number of seconds. Detection of signals relating to any of these conditions preferably causes a batch stoppage, alarm, or both by the microprocessor 2005 which trips an overfill relay. A manual fill push button 2080 and a manual discharge push button 2085 are provided on the front of the PCB to permit a user standing near the field box 2000 to fill and discharge admixture to and from a bottle, or other suitable container.

Figure 15:
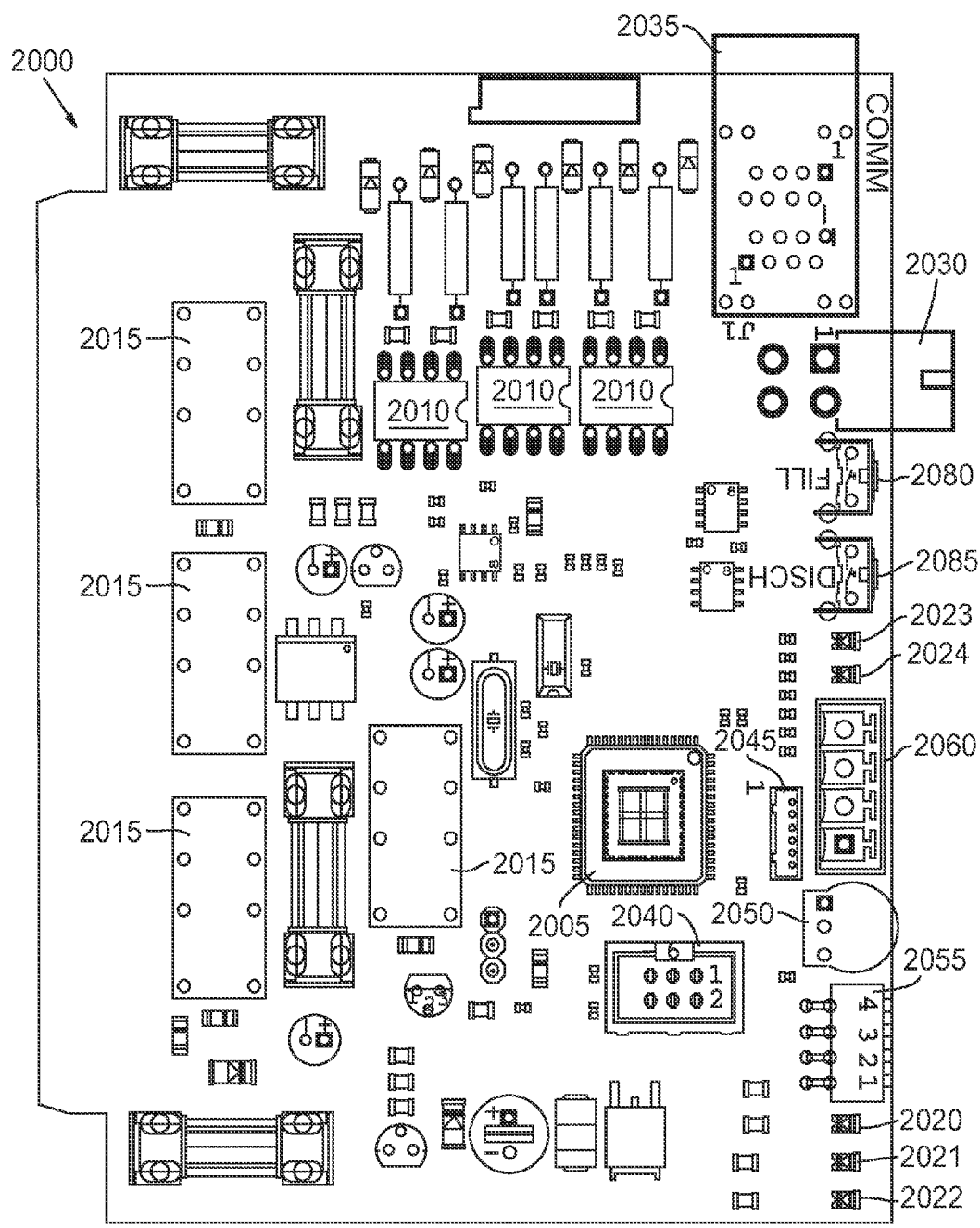
FIG. 15 is top-side view of an exemplary embodiment of a printed circuit board for another field box.

One advantage of a field box 2000 embodied on a PCB, such as illustrated in FIG. 15, is that existing concrete plant controlling equipment, for example, including an AMT-300 or AMT-400 controller card, may be upgraded to become a field box simply by removing the AMT-300 or AMT-400 and replacing it with the field box 2000 PCB. Another advantage of a field box 2000 embodied on a PCB is that field box 2000 operates as an interface card in a dual probe amplifier, such as an AMT-800 Eight Product or Six Product dual probe amplifier.

One optional communication protocol that may be used between the field box 2000 and a batch panel includes a CAN bus, however, other suitable communication protocols may be used. Over the air updates, such as reprogramming operational code, for the field box 2000 may be communicated over the CAN bus, for example, to firmware resident in the field box 2000. For example, a boot loader program (which may include a program that places the operating system of the microprocessor 2005 into memory) may accept encrypted code for updating the firm ware and may be used for over the air updates to implement such firmware upgrades, preferably without interfering with batches that are in progress. A resident program, such as a boot loader program, may also support read capability, write capability, or both for EEPROM settings thus allowing over the air parameter setting and reading. Additionally, a RS485 multi drop communication may be used as the communications standard between a remote display or computer and the field box 2000.

Figure 18:
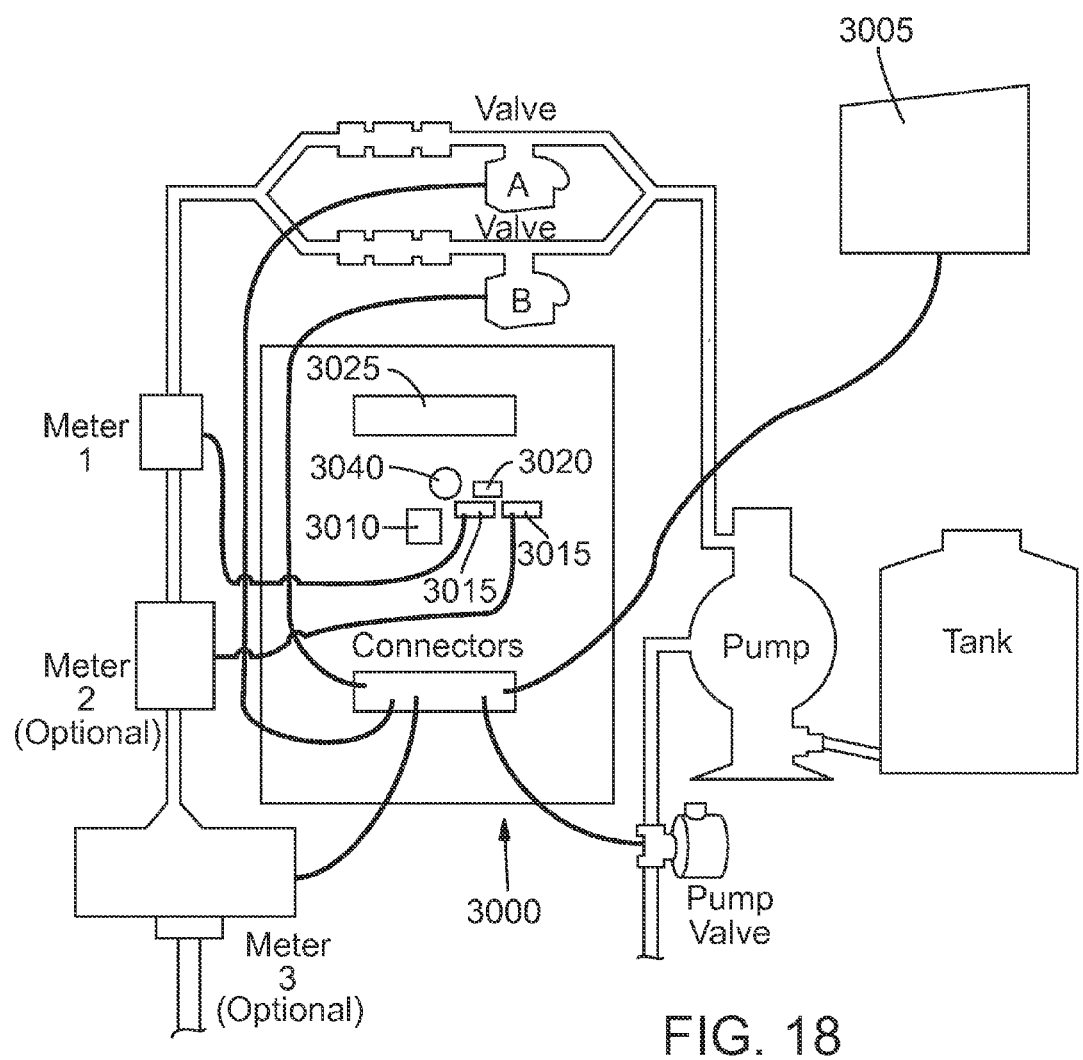
FIG. 18 is another schematic illustration of a control system for concrete plants.

FIG. 18 illustrates another example field box 3000 that may include some or all of the capabilities or functionality of a master controller. The field box 3000 is similar to the field box 2000 and includes CAN communications capabilities with the batch panel 3005 to send the data to the batch 3005 so the data can be sent to the web by the batch panel 3005. The CAN communications capabilities also preferably provide a channel to the processor 3010, for example, for a program such as a boot loader to make over the air updates to the processor 3010. For example, the program may provide firmware upgrades without interfering with any batches that are in progress, and may perform read operations, write operations, or both for the EEPROM settings thus allowing over the air parameter setting and reading. An RS485 multi drop communications may be used as the communications standard between a remote display or computer and the field box 3000. An optical isolator circuit receives signals from the batch panel 3005, such as a fill signal, and transmits corresponding signals to the processor 3010 which determines whether a signal, such as a fill signal, is present (active) or absent (inactive) based on the corresponding signals received from the optical isolator circuit. After receiving metering pulses, the field box 3000 may transmit metering pulses to the batch panel 3005, for example, as discussed above. Preferably, the field box 3000 is constructed to vary, or switch, the meter pulses sent to the batch panel 3005 among or between AC loads of 24-280 VAC and DC loads of 24VDC. Preferably, the field box 3000 includes its own 120VAC power supply, and may include brown out and power on reset circuitry for reliable operation. Connectors 3015 for receiving signals or pulses from two magnetic flow meters, or other suitable meters, are preferably included along with a third connector 3020 for connecting to a nutating disk or wobble plate type flow meter. Similar to other field box embodiments, status LEDs are preferably controlled by the processor 3010. A 2 line LCD display 3025, or other suitable display, may be included to provide a user feedback information or status information regarding the field box 3000 or the status of operations performed by the field box 3000. A joystick 3040, or other suitable input device, may be provided for a user to input information or commands to the field box 3000.

Customized Admixtures

Many current concrete plants use pre-mixed admixtures that are delivered from an admixture company. Such pre-mixed admixtures are akin to a one size fits all hat, they work for many applications, but not all. Traditionally, the time and expense of creating and delivering customized admixtures has been overly time consuming and uneconomical.

The present inventors have recognized that customized admixtures for concrete plants preferably permits concrete plants to tailor the finished admixture product for a particular building specification as well as the ingredients used to create a batch of concrete and environmental conditions in which the concrete will be used. The present inventors also realized that a control system including distributed intelligent controllers communicating with a batch computer preferably makes customized admixtures economical and no more time consuming than using pre-mixed admixtures.

Figure 14:
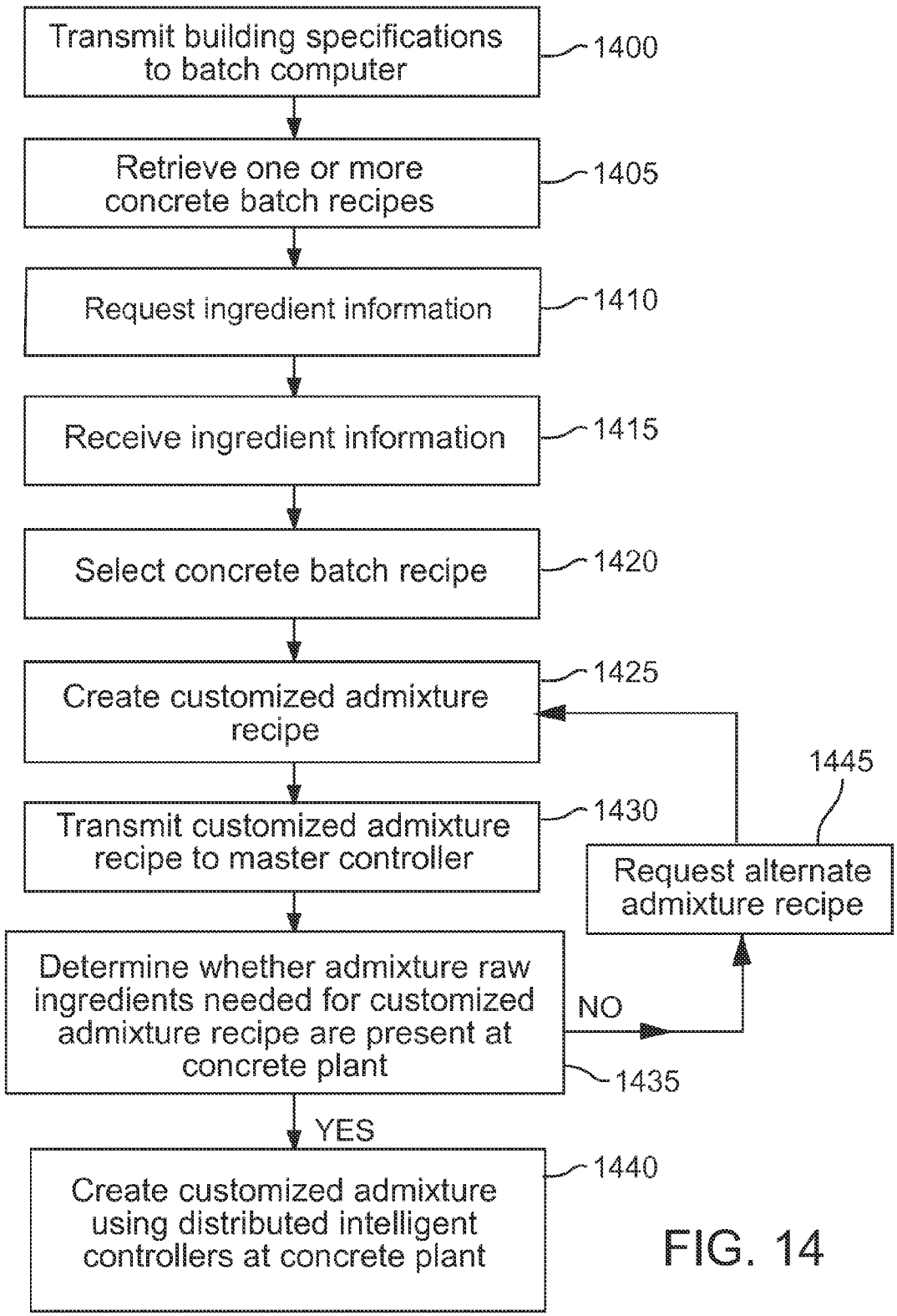
FIG. 14 is a flow chart for a method for creating customized admixtures.

Referring to FIGS. 2 and 14, an exemplary embodiment for creating customized admixtures is illustrated. At step 1400, an operator inputs building specifications into batch panel 20 and transmits the building specifications to batch computer 55 through master controller 25 as discussed above. At step 1405, batch computer 55 receives the building specifications and, based on the building specifications, retrieves one or more concrete batch recipes, either from a database residing on batch computer 55 or from a database residing on a computer connected to computer network 70.

At step 1410, batch computer 55 transmits an inquiry to batch panel 20 via master controller 25 requesting information about the type of ingredients available to create a batch of concrete, the source of such ingredients, the temperature and moisture content of such ingredients, and environmental conditions such as temperature and humidity at the site where the batch of concrete will be used. Alternately, batch computer 55 may request other information or less information, or suitable information may be transmitted with the building specifications. In other alternate embodiments, a customized admixture may be based solely on the building specifications, thus making steps 1410 and 1415 optional.

At step 1415, batch computer 55 receives the requested information from batch panel 20 via master controller 25. Batch panel 20 may collect such information from a combination of databases and sensors associated with the ingredients used to make concrete. For example, a database containing information regarding the source of each concrete ingredient and temperature and moisture sensors proximate the concrete ingredients and communicating with intelligent controllers as described above may be used. Alternately, an operator may input information into batch panel 20, or operator input may be combined with automated information gathering.

At step 1420, batch computer 55, or an operator using batch computer 55, selects a concrete batch recipe based on the information received from batch panel 20. For example, batch computer 55, or an operator using batch computer 55, preferably selects a concrete batch recipe that satisfies the building specifications and calls for ingredients most closely matching what is available at the concrete plant 10.

At step 1425, batch computer 55, or an operator using batch computer 55, accesses the computer network 70 to access a recipe editor 85. Preferably, the recipe editor 85 is a software program used to update the selected concrete batch recipe, for example, to modify any non-admixture ingredients to correspond to the actual non-admixture ingredients available at the concrete plant 10. The recipe editor 85 is also preferably used to create a customized admixture to match the selected concrete batch recipe. Creating a customized admixture using the recipe editor 85 is also preferably based on the information transmitted from batch panel 20 to batch computer 55, such as the building specification, ingredient temperatures and moisture content, environmental conditions, and other suitable information. In alternate embodiments, only a customized admixture recipe is created, and the non-admixture ingredients are not modified.

Once the selected concrete batch recipe has been modified, for example, by including a customized admixture recipe, either by batch computer 55, an operator using batch computer 55, or both, the modified concrete batch recipe is transmitted to master controller 25 at step 1430.

Storage tanks 30 at concrete plant 15 preferably contain admixture raw ingredients. At step 1435, master controller 25 queries field boxes 15 associated with storage tanks 30 to determine whether storage tanks 30 contain sufficient amounts of the admixture raw ingredients needed to create the customized admixture recipe. In response to the query from master controller 25, the field boxes 15 collect information regarding the amount of admixture raw ingredients in the storage tanks 30, for example, by interrogating level sensors 45, and inform master controller whether sufficient amounts of admixture raw ingredients are present at concrete plant 10.

If sufficient amounts of the necessary admixture raw ingredients are present at concrete plant 10, master controller 25 instructs the field boxes 15 to create the customized admixture based on the customized admixture recipe at step 1440. For example, field boxes 15 preferably control pumps, flow meters, or other suitable equipment to transfer the required amounts of admixture raw ingredients from the storage tanks 30 to mixer 75 where the customized admixture is blended.

If sufficient amounts of the necessary admixture raw ingredients are not present at concrete plant 10, master controller 25 informs batch computer 55 that the customized admixture cannot be made at concrete plant 10, and requests an alternate admixture recipe at step 1445. Master controller 25 may include amounts of each admixture raw ingredient available at concrete plant 10 with the request for an alternate customized admixture recipe to guide batch computer 55, an operator using batch computer 55, or both, for forming a new customized admixture recipe. Preferably, batch computer 55, an operator using batch computer 55, or both access the recipe editor 85 and steps 1425, 1430, and 1440 are repeated.

In an alternate embodiment, if concrete plant 10 does not have sufficient amounts of the admixture raw ingredients needed to create the customized admixture recipe, master controller 25 may transmit the actual amounts of admixture raw ingredients available, and how much is needed, to a message center 260 connected to computer network 70. The message center 260 preferably updates an admixture supplier's records 90, such as consumption records or invoice records, to reflect the need for admixture raw ingredients at concrete plant 10.

In other alternate embodiments, communication between master controller 25 or batch panel 20, and batch computer 55, preferably permits "on-the-fly" or real-time modifications to customized admixture recipes. For example, concrete plant 10 may need to create three batches of concrete for use at a jobsite. Because the building specifications are the same for the three batches and they are used at the same location, the same concrete batch recipe should be able to be used to create all three batches of concrete. However, concrete plant 10 may run out of a particular type of ingredient, or environmental conditions may significantly change throughout the course of the day. Because communications between master controller 25 and batch computer 55 permits trained chemists using batch computer 55 to service multiple concrete plants 10 without visiting the site of each concrete plant 10, real-time modifications to admixture recipes, or to concrete batch recipes, may be made. Additionally, modifications to admixture recipes may be automatically carried out through the use of distributed intelligent controllers operating the equipment that dispenses and measures the admixture raw ingredients.

In other embodiments, field boxes 15A may be used to perform the above-described functions instead of field boxes 15. When field boxes 15A are used, a master controller 25 may not be needed.

It will be obvious to those having skill in the art that many changes may be made to the details of the above-described embodiments without departing from the underlying principles of the invention.

The invention claimed is:

1. A distributed system for controlling and monitoring operations of a concrete plant having a central batch panel that outputs command signals, concrete plant equipment for dispensing concrete ingredients, and sensors associated with the concrete plant equipment and transmitting operating signals representing an operating parameter or state of the associated concrete plant equipment, the distributed system comprising:

a plurality of field boxes including first and second field boxes located remotely of the batch panel and proximate the concrete plant equipment, each of the first and second field boxes including a digital processor, a memory, and a communications interface communicating with the batch panel, wherein the first field box receives first command signals from the batch panel and translates the first command signals to first control signals, and the second field box receives second command signals from the batch panel and translates the second command signals to second control signals, wherein:

the first field box communicates with and controls operation of a first portion of the concrete plant equipment using the first control signals;

the second field box communicates with and controls operation of a second portion of the concrete plant equipment using the second control signals;

the first field box receives first operating signals from at least some of the sensors associated with the first portion of the concrete plant equipment, records in its memory first operating parameter data represented by the first operating signals, and transmits to the batch panel a first data signal representing at least some of the first operating parameter data;

the second field box receives second operating signals from at least some of the sensors associated with the second portion of the concrete plant equipment, records in its memory second operating parameter data represented by the second operating signals, and transmits to the batch panel a second data signal representing at least some of the second operating parameter data the digital processor of the first field box is programmed to control and halt operation of at least some of the first portion of the concrete plant equipment based on and directly responsive to receipt of the first operating signals from the first portion of the concrete plant equipment, in the absence of receipt of any signal from the batch panel responsive to the first operating signals; and the digital processor of the second field box is programmed to control and halt operation of at least some of the second portion of the concrete plant equipment based on and directly responsive to receipt of the second operating signals from the second portion of the concrete plant equipment, in the absence of receipt of any signal from the batch panel responsive to the second operating signals.

2. The distributed system controlling and monitoring operations for a concrete plant according to claim 1, wherein:

the first field box shuts off the concrete plant equipment based on successful completion of a control signal or based on the first operating signals indicating errors or faulty operation of the equipment, in the absence of receipt of any signal from the batch panel responsive to the first operating signals.

3. The distributed system for controlling and monitoring operations for a concrete plant according to claim 1, further comprising:

a batch computer communicating with the first and second field boxes;

wherein the first and second field boxes translate and transmit the respective first and second operating signals to the batch computer; and the batch computer is programmed to create operational records for the equipment based on the first and second operating signals.

4. The distributed system for controlling and monitoring operations for a concrete plant according to claim 1, wherein:

the concrete plant equipment includes a tank, and a pump and a flow meter both associated with and in fluid communication with the tank; and the first field box communicates with the pump and the flow meter when the distributed system is connected to the concrete plant equipment to send the first control signals to the pump and to receive the first operating signals from the flow meter.

5. The distributed system for controlling and monitoring operations for a concrete plant according to claim 4 further comprising a batch computer in communication with the field boxes, and wherein:

the flow meter associated with the tank tracks a running total of a volume of fluid that passes out of the associated tank and through the flow meter and the flow meter transmits to the first field box signals indicating the running total of fluid that has flowed through the flow meter;

the tank includes an associated liquid level sensor that generates signals indicating how much liquid is in the tank and the liquid level sensor transmits the signals indicating how much liquid is in the tank to the first field box;

the first field box transmits signals containing information about the running total of fluid that has flowed from the tank and the liquid level in the tank to the batch computer; and the batch computer is programmed to:

monitor a total amount of fluid removed from the tank;

monitor a total amount of fluid in the tank;

compare the total amount of fluid removed against a previous total amount of fluid removed on a periodic basis having a time period to determine the amount of fluid removed from the tank during the time period;

compare the total amount of fluid in the tank against a previous total amount of fluid in the tank on a periodic basis having the time period to determine a change in the fluid amount;

determine a rate of consumption of the fluid in the tank based on the determined amount of fluid removed from the tank and based on the time period;

for the tank, determine an amount of fluid added during the time period based on the determined amount of fluid removed during the time period and the determined change in the fluid amount; and schedule delivery for fluids to the tank based on the determined rate of consumption and the determined amount of fluid added for the tank.

6. The distributed system for controlling and monitoring operations for a concrete plant according to claim 1, wherein each of the first and second field boxes are programmed to receive input indicating a technician serviced at least one of the concrete plant equipment communicating with the field box, and to record when the service was performed.

7. The distributed system for controlling and monitoring operations of a concrete plant according to claim 1, wherein each field box has an address and the first data signal includes a label indicative of the address of the first field box that transmitted the first data signal.

8. The distributed system for controlling and monitoring operations of a concrete plant according to claim 1, further including a master controller including a programmable logic device and a memory, the master controller associated with and in communication with the batch panel, and the master controller in communication with the first and second field boxes such that the master controller is operably interposed between the batch panel and the first and second field boxes.

9. The distributed system for controlling and monitoring operations for a concrete plant according to claim 1, wherein the first field box receives a series of metering pulses transmitted by a flow meter at a first rate, and the first field box is programmed to transmit the entire series of metering pulses to the batch panel at or below a predetermined maximum rate that is different from the first rate.

10. The distributed system for controlling and monitoring operations for a concrete plant according to claim 9, wherein the first field box is further programmed to transmit the series of metering pulses to the batch panel at or below the predetermined maximum rate regardless of the first rate at which metering pulses are received by the first field box from the flow meter.

11. The distributed system for controlling and monitoring operations for a concrete plant according to claim 9, wherein the first field box is further programmed to aggregate metering pulses received from the flow meter and to transmit the entire series of metering pulses to the batch panel at a second rate that is lower than the first rate at which the series of metering pulses are received by the first field box from the flow meter.

12. The distributed system for controlling and monitoring operations for a concrete plant according to claim 9, wherein the first field box is further programmed to shape at least some of the metering pulses of the series of metering pulses received from the flow meter before transmitting the series of metering pulses to the batch panel.

* * * * *